United States Patent
Agiwal

(10) Patent No.: US 12,207,311 B2
(45) Date of Patent: Jan. 21, 2025

(54) METHOD AND APPARATUS FOR RANDOM ACCESS PROCEDURE FOR SMALL DATA TRANSMISSION IN WIRELESS COMMUNICATION SYSTEM

(71) Applicant: Samsung Electronics Co., Ltd., Suwon-si (KR)

(72) Inventor: Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 21 days.

(21) Appl. No.: 17/378,273

(22) Filed: Jul. 16, 2021

(65) Prior Publication Data
US 2022/0022266 A1    Jan. 20, 2022

(30) Foreign Application Priority Data
Jul. 17, 2020    (KR) .......................... 10-2020-0089161

(51) Int. Cl.
*H04W 74/00* (2009.01)
*H04W 72/02* (2009.01)
(Continued)

(52) U.S. Cl.
CPC ....... *H04W 74/0841* (2013.01); *H04W 72/02* (2013.01); *H04W 74/002* (2013.01); *H04W 76/30* (2018.02)

(58) Field of Classification Search
CPC ............ H04W 74/0841; H04W 72/02; H04W 74/008; H04W 76/30; H04W 74/0833; H04W 74/004; H04W 76/11; H04W 76/19; H04W 76/28; H04W 74/02; H04W 74/08; H04W 76/20; H04W 74/002
See application file for complete search history.

(56) References Cited

U.S. PATENT DOCUMENTS

2017/0099660 A1\* 4/2017 Oh .................... H04L 5/0064
2018/0092157 A1    3/2018 Chen
(Continued)

FOREIGN PATENT DOCUMENTS

WO    2019/134566 A1    7/2019
WO    2020/088097 A1    5/2020
(Continued)

OTHER PUBLICATIONS

International Search Report dated Oct. 27, 2021, issued in International Patent Application No. PCT/KR2021/009193.
(Continued)

*Primary Examiner* — Un C Cho
*Assistant Examiner* — Lalita W Pace
(74) *Attorney, Agent, or Firm* — Jefferson IP Law, LLP

(57) ABSTRACT

A method performed by a terminal in a wireless communication system is provided. The method includes in case that a random access procedure for small data transmission (SDT) in a radio resource control (RRC) inactive state is initiated, transmitting, to a base station, a RRC message including a parameter associated with a size of uplink data, receiving, from the base station, a response message including information associated with transmission resource for the uplink data, and transmitting, to the base station, the uplink data based on the transmission resource.

9 Claims, 16 Drawing Sheets

(51) Int. Cl.
*H04W 74/0833* (2024.01)
*H04W 74/0836* (2024.01)
*H04W 76/30* (2018.01)

(56) References Cited

U.S. PATENT DOCUMENTS

| | | | | |
|---|---|---|---|---|
| 2018/0103465 | A1 | 4/2018 | Agiwal et al. | |
| 2018/0324869 | A1* | 11/2018 | Phuyal | H04W 72/14 |
| 2018/0343673 | A1* | 11/2018 | Chen | H04W 74/006 |
| 2019/0166529 | A1* | 5/2019 | Chen | H04W 36/38 |
| 2019/0208411 | A1* | 7/2019 | Shrestha | H04L 9/0861 |
| 2019/0350002 | A1* | 11/2019 | Chen | H04W 72/14 |
| 2019/0357272 | A1 | 11/2019 | Lim et al. | |
| 2020/0146069 | A1* | 5/2020 | Chen | H04B 17/327 |
| 2020/0275512 | A1* | 8/2020 | Wu | H04W 76/27 |
| 2020/0351955 | A1* | 11/2020 | Jeon | H04L 5/0092 |
| 2020/0374966 | A1 | 11/2020 | Chang et al. | |
| 2021/0014899 | A1* | 1/2021 | Shih | H04W 74/0833 |
| 2021/0120581 | A1* | 4/2021 | Kim | H04W 72/23 |
| 2021/0168862 | A1* | 6/2021 | Murray | H04W 74/002 |
| 2021/0227575 | A1* | 7/2021 | Ou | H04W 76/11 |
| 2021/0259021 | A1* | 8/2021 | Huang | H04W 76/10 |
| 2021/0274525 | A1* | 9/2021 | Wei | H04W 76/27 |
| 2022/0046717 | A1* | 2/2022 | Zhang | H04L 1/1861 |
| 2022/0104275 | A1* | 3/2022 | Bao | H04W 74/0833 |
| 2022/0256473 | A1* | 8/2022 | Kiilerich Pratas | H04W 52/283 |
| 2022/0272767 | A1* | 8/2022 | Liu | H04W 76/30 |
| 2023/0013851 | A1* | 1/2023 | Lin | H04L 1/16 |
| 2023/0030443 | A1* | 2/2023 | Chen | H04W 74/0833 |
| 2023/0058706 | A1* | 2/2023 | Liang | H04W 52/0229 |
| 2023/0127054 | A1* | 4/2023 | Lee | H04W 76/27 370/329 |
| 2023/0164773 | A1* | 5/2023 | Alfarhan | H04W 72/52 370/329 |

FOREIGN PATENT DOCUMENTS

| | | | | |
|---|---|---|---|---|
| WO | WO-2020092337 | A1 * | 5/2020 | ........ H04W 74/0833 |
| WO | WO-2021139620 | A1 * | 7/2021 | |

OTHER PUBLICATIONS

Ericsson, PUSCH selection and MsgA payloads in 2-step RA, R2-1912682, 3GPP TSG-RAN WG2 #107bis, Chongqing, China, Oct. 14-18, 2019.

Ericsson, Details of solution B for small data transmission in RRC_INACTIVE, R2-1700890,3GPP TSG-RAN WG2 #97, Athens, Greece, Feb. 13-17, 2017.

Intel Corporation, Further consideration of 2-step CBRA, R2-1816697,3GPP TSG-RAN WG2 meeting #104, Spokane, USA, Nov. 12-16, 2018.

CMCC, Discussion of MsgA content for different cases, R2-1905920, 3GPP TSG-RAN WG2 Meeting #106, Reno, USA, May 13-17, 2019.

Extended European Search Report dated Oct. 26, 2023, issued in European Application No. 21843386.0-1215.

* cited by examiner

METHOD AND APPARATUS FOR RANDOM ACCESS PROCEDURE FOR SMALL DATA TRANSMISSION IN WIRELESS COMMUNICATION SYSTEM

CROSS-REFERENCE TO RELATED APPLICATION(S)

This application is based on and claims priority under 35 U.S.C. § 119(a) of a Korean patent application number 10-2020-0089161, filed on Jul. 17, 2020, in the Korean Intellectual Property Office, the disclosure of which is incorporated by reference herein in its entirety.

BACKGROUND

1. Field

The disclosure relates to wireless communication systems. More particularly, the disclosure relates to a method and apparatus for effectively providing a service in a wireless communication system.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (millimeter (mm) Wave) bands, e.g., 60 gigahertz (GHz) bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide methods and apparatuses for effectively providing a service in a wireless communication system.

Additional aspects will be set forth in part in the description which follows and, in part, will be apparent from the description, or may be learned by practice of the presented embodiments.

In accordance with an aspect of the disclosure, a method performed by a terminal in a wireless communication system is provided. The method includes in case that a random access procedure for small data transmission (SDT) in a radio resource control (RRC) inactive state is initiated, transmitting, to a base station, a RRC message including a parameter associated with a size of uplink data, receiving, from the base station, a response message including information associated with transmission resource for the uplink data, and transmitting, to the base station, the uplink data based on the transmission resource.

In accordance with another aspect of the disclosure, a method performed by a terminal in a wireless communication system is provided. The method includes in case that a random access procedure for small data transmission (SDT) in a radio resource control (RRC) inactive state is initiated, transmitting, to a base station, a random access preamble, receiving, from the base station, information indicating that the terminal is to perform non-SDT, based on the information, identifying whether to end the ongoing random access procedure for the SDT, and performing the non-SDT.

In accordance with another aspect of the disclosure, a method performed by a base station in a wireless communication system is provided. The method includes in case that a random access procedure for small data transmission (SDT) in a radio resource control (RRC) inactive state is initiated, receiving, from a terminal, a RRC message including a parameter associated with a size of uplink data, transmitting, to the terminal, a response message including information associated with a transmission resource for the uplink data, and receiving, from the terminal, the uplink data based on the transmission resource.

In accordance with another aspect of the disclosure, a terminal in a wireless communication system is provided. The terminal includes a transceiver, and at least one processor configured to in case that a random access procedure for small data transmission (SDT) in a radio resource control (RRC) inactive state is initiated, transmit, to a base station via the transceiver, a RRC message including a parameter associated with a size of uplink data, receive, from the base station via the transceiver, a response message including information associated with a transmission resource for the uplink data, and transmit, to the base station via the transceiver, the uplink data based on the transmission resource.

In accordance with another aspect of the disclosure, a method performed by a base station in a wireless communication system is provided. The method includes in case that a random access procedure for small data transmission (SDT) in a radio resource control (RRC) inactive state is initiated, receiving, from a terminal, a random access preamble, transmitting, to the terminal, information indicating that the terminal is to perform non-SDT, wherein whether to end the ongoing random access procedure for the SDT is identified based on the information, and performing the non-SDT based on the identification.

In an embodiment, the method further includes when the end of the ongoing random access procedure is identified, initiate a new random access (RA) procedure using a non-SDT RA channel (RACH) configuration.

In an embodiment, the method further includes when the end of the ongoing random access procedure is not identified, generating a resume message which is transmitted in the random access preamble.

In accordance with another aspect of the disclosure, a terminal in a wireless communication system is provided. The terminal includes a transceiver, and at least one processor configured to in case that a random access procedure for small data transmission (SDT) in a radio resource control (RRC) inactive state is initiated, transmit, to a base station via the transceiver, a random access preamble, receive, from the base station via the transceiver, information indicating that the terminal is to perform non-SDT, based on the information, identify whether to end the ongoing random access procedure for the SDT, and perform the non-SDT based on the identification.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
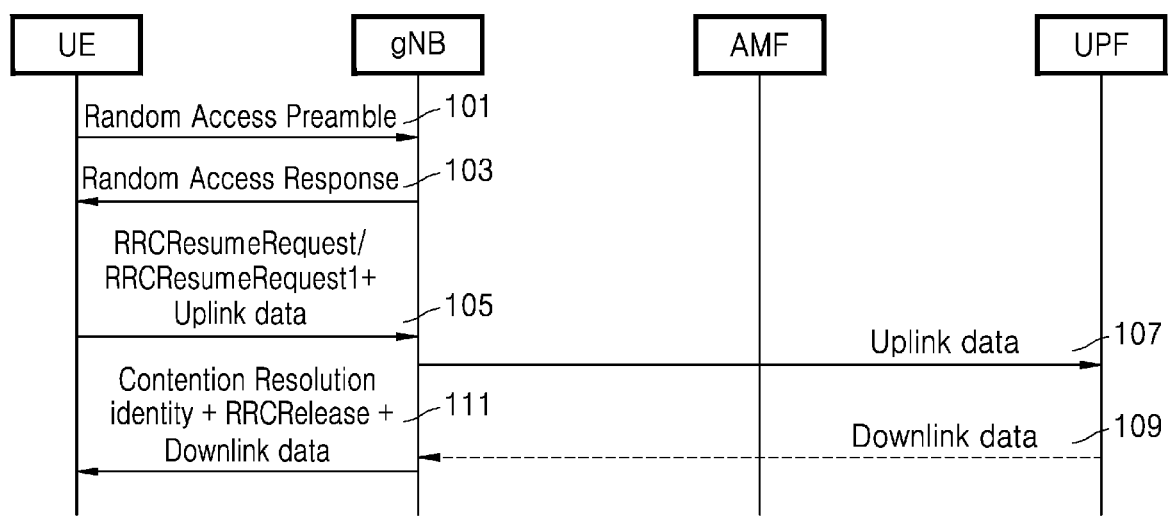
FIG. 1 is a flow chart illustrating small data transmission using 4 step random access (RA) according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof. Throughout the specification, a layer (or a layer apparatus) may also be referred to as an entity. Hereinafter, operation principles of the disclosure will be described in detail with reference to accompanying drawings. In the following descriptions, well-known functions or configurations are not described in detail because they would obscure the disclosure with unnecessary details. The terms used in the specification are defined in consideration of functions used in the disclosure, and can be changed according to the intent or commonly used methods of users or operators. Accordingly, definitions of the terms are understood based on the entire descriptions of the specification.

For the same reasons, in the drawings, some elements may be exaggerated, omitted, or roughly illustrated. Also, a size of each element does not exactly correspond to an actual size of each element. In each drawing, elements that are the same or are in correspondence are rendered the same reference numeral.

Advantages and features of the disclosure and methods of accomplishing the same may be understood more readily by reference to the following detailed descriptions of embodiments and accompanying drawings of the disclosure. The disclosure may, however, be embodied in many different forms and should not be construed as being limited to the embodiments set forth herein; rather, these embodiments of the disclosure are provided so that this disclosure will be thorough and complete, and will fully convey the concept of the disclosure to one of ordinary skill in the art. Therefore, the scope of the disclosure is defined by the appended claims. Throughout the specification, like reference numerals refer to like elements. It will be understood that blocks in flowcharts or combinations of the flowcharts may be performed by computer program instructions. Because these computer program instructions may be loaded into a processor of a general-purpose computer, a special-purpose computer, or another programmable data processing apparatus, the instructions, which are performed by a processor of a computer or another programmable data processing apparatus, create units for performing functions described in the flowchart block(s).

The computer program instructions may be stored in a computer-usable or computer-readable memory capable of directing a computer or another programmable data processing apparatus to implement a function in a particular manner, and thus the instructions stored in the computer-usable or computer-readable memory may also be capable of producing manufactured items containing instruction units for performing the functions described in the flowchart block(s). The computer program instructions may also be loaded into a computer or another programmable data processing apparatus, and thus, instructions for operating the computer or the other programmable data processing apparatus by generating a computer-executed process when a series of operations are performed in the computer or the other programmable data processing apparatus may provide operations for performing the functions described in the flowchart block(s).

In addition, each block may represent a portion of a module, segment, or code that includes one or more executable instructions for executing specified logical function(s). It is also noted that, in some alternative implementations, functions mentioned in blocks may occur out of order. For example, two consecutive blocks may also be executed simultaneously or in reverse order depending on functions corresponding thereto.

As used herein, the term "unit" denotes a software element or a hardware element such as a field-programmable gate array (FPGA) or an application-specific integrated circuit (ASIC), and performs a certain function. However, the term "unit" is not limited to software or hardware. The "unit" may be formed so as to be in an addressable storage medium, or may be formed so as to operate one or more processors. Thus, for example, the term "unit" may include elements (e.g., software elements, object-oriented software elements, class elements, and task elements), processes, functions, attributes, procedures, subroutines, segments of program code, drivers, firmware, micro-codes, circuits, data, a database, data structures, tables, arrays, or variables.

Functions provided by the elements and "units" may be combined into the smaller number of elements and "units", or may be divided into additional elements and "units". Furthermore, the elements and "units" may be embodied to reproduce one or more central processing units (CPUs) in a device or security multimedia card. Also, in an embodiment of the disclosure, the "unit" may include at least one processor. In the following descriptions of the disclosure, well-known functions or configurations are not described in detail because they would obscure the disclosure with unnecessary details.

Hereinafter, for convenience of explanation, the disclosure uses terms and names defined in the 3rd generation partnership project long term evolution (3GPP LTE) standards. However, the disclosure is not limited to the terms and names, and may also be applied to systems following other standards.

In the disclosure, an evolved node B (eNB) may be interchangeably used with a next-generation node B (gNB) for convenience of explanation. That is, a base station (BS) described by an eNB may represent a gNB. In the following descriptions, the term "base station" refers to an entity for allocating resources to a user equipment (UE) and may be used interchangeably with at least one of a gNode B, an eNode B, a node B, a base station (BS), a radio access unit, a base station controller (BSC), or a node over a network. The term "terminal" may be used interchangeably with a user equipment (UE), a mobile station (MS), a cellular phone, a smartphone, a computer, or a multimedia system capable of performing communication functions. However, the disclosure is not limited to the aforementioned examples. In particular, the disclosure is applicable to 3GPP new radio (NR) (or 5th generation (5G)) mobile communication standards. In the following description, the term eNB may be interchangeably used with the term gNB for convenience of explanation. That is, a base station explained as an eNB may also indicate a gNB. The term UE may also indicate a mobile phone, NB-IoT devices, sensors, and other wireless communication devices.

In the recent years several broadband wireless technologies have been developed to meet the growing number of broadband subscribers and to provide more and better applications and services. The second generation wireless communication system has been developed to provide voice services while ensuring the mobility of users. Third generation wireless communication system supports not only the voice service but also data service. In recent years, the fourth wireless communication system has been developed to provide high-speed data service. However, currently, the fourth generation wireless communication system suffers from lack of resources to meet the growing demand for high speed data services. So fifth generation wireless communication system (also referred as next generation radio or NR) is being developed to meet the growing demand for high speed data services, support ultra-reliability and low latency applications.

The fifth generation wireless communication system supports not only lower frequency bands but also in higher frequency (mmWave) bands, e.g., 10 GHz to 100 GHz bands, so as to accomplish higher data rates. To mitigate propagation loss of the radio waves and increase the transmission distance, the beamforming, massive Multiple-Input Multiple-Output (MIMO), Full Dimensional MIMO (FD-MIMO), array antenna, an analog beam forming, large scale antenna techniques are being considered in the design of fifth generation wireless communication system.

In addition, the fifth generation wireless communication system is expected to address different use cases having quite different requirements in terms of data rate, latency, reliability, mobility etc. However, it is expected that the design of the air-interface of the fifth generation wireless communication system would be flexible enough to serve the UEs having quite different capabilities depending on the use case and market segment the UE cater service to the end customer.

Few example use cases the fifth generation wireless communication system wireless system is expected to address are enhanced Mobile Broadband (eMBB), massive Machine Type Communication (m-MTC), ultra-reliable low latency communication (URLL), etc.

The eMBB requirements like tens of Gbps data rate, low latency, high mobility and so forth address the market segment representing the conventional wireless broadband subscribers needing internet connectivity everywhere, all the time and on the go.

The m-MTC requirements like very high connection density, infrequent data transmission, very long battery life, low mobility address and so forth address the market segment representing the Internet of Things (IoT)/Internet of Everything (IoE) envisioning connectivity of billions of devices.

The URLL requirements like very low latency, very high reliability and variable mobility and so forth address the market segment representing the Industrial automation application, vehicle-to-vehicle/vehicle-to-infrastructure communication foreseen as one of the enablers for autonomous cars.

The fifth generation wireless communication system, supports standalone mode of operation and dual connectivity (DC) as well. In DC, a multiple Rx/Tx UE may be configured to utilize resources provided by two different nodes (or NBs) connected via non-ideal backhaul. One node acts as the Master Node (MN) and the other as the Secondary Node (SN). The MN and SN are connected via a network interface and at least the MN is connected to the core network. NR also supports Multi-RAT Dual Connectivity (MR-DC) operation whereby a UE in RRC_CONNECTED is configured to utilize radio resources provided by two distinct schedulers, located in two different nodes connected via a non-ideal backhaul and providing either evolved-universal terrestrial radio access (E-UTRA) (i.e. if the node is an ng-eNB) or NR access (i.e. if the node is a gNB). In the NR for a UE in RRC_CONNECTED not configured with CA/DC there is only one serving cell comprising of the primary cell. For a UE in RRC_CONNECTED configured with CA/DC the term 'serving cells' is used to denote the set of cells comprising of the Special Cell(s) and all secondary cells. In NR the term Master Cell Group (MCG) refers to a group of serving cells associated with the Master Node, comprising of the primary cell (PCell) and optionally one or more secondary cells (SCells). In NR the term Secondary Cell Group (SCG) refers to a group of serving cells associated with the Secondary Node, comprising of the PSCell and optionally one or more SCells. In NR primary cell (PCell) refers to a serving cell in MCG, operating on the primary frequency, in which the UE either performs the initial connection establishment procedure or initiates the connection re-establishment procedure. In the NR for a UE configured with CA, Scell is a cell providing additional radio resources on top of Special Cell. Primary SCG Cell (PSCell) refers to a serving cell in SCG in which the UE performs random access when performing the Reconfiguration with Sync procedure. For Dual Connectivity operation the term Special Cell (SpCell) refers to the PCell of the MCG or the PSCell of the SCG, otherwise the term Special Cell refers to the PCell.

In the fifth generation wireless communication system, Physical Downlink Control Channel (PDCCH) is used to schedule DL transmissions on physical downlink shared channel (PDSCH) and UL transmissions on Physical Uplink Control Channel (PUSCH), where the Downlink Control Information (DCI) on the PDCCH includes: Downlink assignments containing at least modulation and coding format, resource allocation, and hybrid-ARQ information related to DL-SCH; Uplink scheduling grants containing at least modulation and coding format, resource allocation, and hybrid-ARQ information related to UL-SCH. In addition to scheduling, the PDCCH can be used to for: Activation and deactivation of configured PUSCH transmission with configured grant; Activation and deactivation of PDSCH semi-persistent transmission; Notifying one or more UEs of the slot format; Notifying one or more UEs of the PRB(s) and OFDM symbol(s) where the UE may assume no transmission is intended for the UE; Transmission of TPC commands for the PUCCH and the PUSCH; Transmission of one or more TPC commands for SRS transmissions by one or more UEs; Switching a UE's active bandwidth part; Initiating a random access procedure. A UE monitors a set of PDCCH candidates in the configured monitoring occasions in one or more configured COntrol REsource SETs (CORESETs) according to the corresponding search space configurations. A CORESET consists of a set of PRBs with a time duration of 1 to 3 OFDM symbols. The resource units Resource Element Groups (REGs) and Control Channel Elements (CCEs) are defined within a CORESET with each CCE consisting a set of REGs. Control channels are formed by aggregation of CCE. Different code rates for the control channels are realized by aggregating different number of CCE. Interleaved and non-interleaved CCE-to-REG mapping are supported in a CORESET. Polar coding is used for PDCCH. Each resource element group carrying PDCCH carries its own Demodulation Reference Signal (DMRS). Quadrature Phase Shift Keying (QPSK) modulation is used for PDCCH.

In fifth generation wireless communication system, a list of search space configurations are signaled by the GNB for each configured Bandwidth Part (BWP) wherein each search configuration is uniquely identified by an identifier. Identifier of search space configuration to be used for specific purpose such as paging reception, SI reception, random access response reception is explicitly signaled by the gNB. In NR search space configuration comprises parameters Monitoring-periodicity-PDCCH-slot, Monitoring-offset- PDCCH-slot, Monitoring-symbols-PDCCH-within-slot and duration. A UE determines PDCCH monitoring occasion (s) within a slot using the parameters PDCCH monitoring periodicity (Monitoring-periodicity-PDCCH-slot), the PDCCH monitoring offset (Monitoring-offset-PDCCH-slot), and the PDCCH monitoring pattern (Monitoring-symbols-PDCCH-within-slot). PDCCH monitoring occasions are there in slots 'x' to x+duration where the slot with number 'x' in a radio frame with number 'y' satisfies the equation below:

$$(y*(\text{number of slots in a radio frame})+x-\text{Monitoring-offset-PDCCH-slot}) \bmod (\text{Monitoring-periodicity-PDCCH-slot})=0;$$    Equation 1

The starting symbol of a PDCCH monitoring occasion in each slot having PDCCH monitoring occasion is given by Monitoring-symbols-PDCCH-within-slot. The length (in symbols) of a PDCCH monitoring occasion is given in the corset associated with the search space. search space configuration includes the identifier of coreset configuration associated with it. A list of coreset configurations are signaled by the GNB for each configured BWP wherein each coreset configuration is uniquely identified by an identifier. Note that each radio frame is of 10 ms duration. Radio frame is identified by a radio frame number or system frame number. Each radio frame comprises of several slots wherein the number of slots in a radio frame and duration of slots depends on sub carrier spacing. The number of slots in a radio frame and duration of slots depends radio frame for each supported subcarrier spacing (SCS) is pre-defined in NR. Each coreset configuration is associated with a list of Transmission configuration indicator (TCI) states. One DL RS ID (SSB or CSI RS) is configured per TCI state. The list of TCI states corresponding to a coreset configuration is signaled by the gNB via RRC signaling. One of the TCI state in TCI state list is activated and indicated to the UE by the gNB. TCI state indicates the DL TX beam (DL TX beam is QCLed with SSB/CSI RS of TCI state) used by the GNB for transmission of the PDCCH in the PDCCH monitoring occasions of a search space.

In fifth generation wireless communication system bandwidth adaptation (BA) is supported. With BA, the receive and transmit bandwidth of a UE need not be as large as the bandwidth of the cell and can be adjusted: the width can be ordered to change (e.g. to shrink during period of low activity to save power); the location can move in the frequency domain (e.g. to increase scheduling flexibility); and the subcarrier spacing can be ordered to change (e.g. to allow different services). A subset of the total cell bandwidth of a cell is referred to as a Bandwidth Part (BWP). The BA is achieved by configuring the RRC connected the UE with BWP(s) and telling the UE which of the configured BWPs is currently the active one. When the BA is configured, the UE only has to monitor the PDCCH on the one active BWP, i.e. it does not have to monitor PDCCH on the entire DL frequency of the serving cell. In RRC connected state, the UE is configured with one or more DL and UL BWPs, for each configured Serving Cell (i.e. PCell or SCell). For an activated Serving Cell, there is always one active UL and DL BWP at any point in time. The BWP switching for a Serving Cell is used to activate an inactive BWP and deactivate an active BWP at a time. The BWP switching is controlled by the PDCCH indicating a downlink assignment or an uplink grant, by the bwp-InactivityTimer, by RRC signaling, or by the MAC entity itself upon initiation of Random Access procedure. Upon addition of SpCell or activation of an SCell, the DL BWP and UL BWP indicated by firstActive-DownlinkBWP-Id and firstActiveUplinkBWP-Id respectively is active without receiving PDCCH indicating a downlink assignment or an uplink grant. The active BWP for a Serving Cell is indicated by either the RRC or the PDCCH. For unpaired spectrum, a DL BWP is paired with a UL BWP, and BWP switching is common for both the UL and the DL. Upon expiry of BWP inactivity timer UE switch to the active DL BWP to the default DL BWP or initial DL BWP (if default DL BWP is not configured).

In the 5G wireless communication system, random access (RA) is supported. Random Access (RA) is used to achieve uplink (UL) time synchronization. RA is used during initial access, handover, radio resource control (RRC) connection re-establishment procedure, scheduling request transmission, secondary cell group (SCG) addition/modification, beam failure recovery and data or control information transmission in the UL by a non-synchronized UE in RRC CONNECTED state. Several types of random access procedure is supported.

Contention based random access (CBRA): This is also referred as 4 step CBRA. In this type of random access, the UE first transmits Random Access preamble (also referred as Msg1) and then waits for Random Access Response (RAR) in the RAR window. RAR is also referred as Msg2. A next generation node B (gNB) transmits the RAR on physical downlink shared channel (PDSCH). The PDCCH scheduling the PDSCH carrying RAR is addressed to RA-radio network temporary identifier (RA-RNTI). The RA-RNTI identifies the time-frequency resource (also referred as physical RA channel (PRACH) occasion or PRACH transmission (TX) occasion or RA channel (RACH) occasion) in which RA preamble was detected by the gNB. The RA-RNTI is calculated as follows: RA-RNTI=1+s_id+14*t_id+14*80*f_id+14*80*8*ul_carrier_id, where s_id is the index of the first orthogonal frequency division multiplexing (OFDM) symbol of the PRACH occasion where the UE has transmitted Msg1, i.e. RA preamble; 0≤s id≤14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for supplementary UL (SUL) carrier. Several RARs for various random access preambles detected by the gNB can be multiplexed in the same RAR media access control (MAC) protocol data unit (PDU) by the gNB. An RAR in the MAC PDU corresponds to the UE's RA preamble transmission if the RAR includes an RA preamble identifier (RAPID) of RA preamble transmitted by the UE. If the RAR corresponding to its RA preamble transmission is not received during the RAR window and the UE has not yet transmitted the RA preamble for a configurable (configured by the gNB in RACH configuration) number of times, the UE goes back to first step i.e. select random access resource (preamble/RACH occasion) and transmits the RA preamble. A backoff may be applied before going back to first step.

If the RAR corresponding to its RA preamble transmission is received the UE transmits message 3 (Msg3) in UL grant received in RAR. Msg3 includes message such as RRC connection request, RRC connection re-establishment request, the RRC handover confirm, scheduling request, SI request etc. It may include the UE identity (i.e. cell-radio network temporary identifier (C-RNTI) or system architecture evolution (SAE)-temporary mobile subscriber identity (S-TMSI) or a random number). After transmitting the Msg3, the UE starts a contention resolution timer. While the contention resolution timer is running, if the UE receives a physical downlink control channel (PDCCH) addressed to C-RNTI included in Msg3, contention resolution is considered successful, contention resolution timer is stopped and the RA procedure is completed. While the contention resolution timer is running, if the UE receives contention resolution MAC control element (CE) including the UE's contention resolution identity (first X bits of common control channel (CCCH) service data unit (SDU) transmitted in Msg3), contention resolution is considered successful, contention resolution timer is stopped and the RA procedure is completed. If the contention resolution timer expires and the UE has not yet transmitted the RA preamble for a configurable number of times, the UE goes back to first step i.e. select random access resource (preamble/RACH occasion) and transmits the RA preamble. A backoff may be applied before going back to first step.

Contention free random access (CFRA): This is also referred as legacy CFRA or 4 step CFRA. CFRA procedure is used for scenarios such as handover where low latency is required, timing advance establishment for secondary cell (Scell), etc. Evolved node B (eNB) assigns to the UE dedicated random access preamble. The UE transmits the dedicated RA preamble. The ENB transmits the RAR on PDSCH addressed to RA-RNTI. The RAR conveys the RA preamble identifier and timing alignment information. The RAR may also include a UL grant. The RAR is transmitted in a RAR window similar to contention based RA (CBRA) procedure. The CFRA is considered successfully completed after receiving the RAR including the RA preamble identifier (RAPID) of the RA preamble transmitted by the UE. In case the RA is initiated for beam failure recovery, the CFRA is considered successfully completed if the PDCCH addressed to C-RNTI is received in search space for beam failure recovery. If the RAR window expires and the RA is not successfully completed and the UE has not yet transmitted the RA preamble for a configurable (configured by the gNB in RACH configuration) number of times, the UE retransmits the RA preamble.

For certain events such as handover and beam failure recovery, if dedicated preamble(s) are assigned to the UE, during first step of random access i.e. during random access resource selection for Msg1 transmission the UE determines whether to transmit dedicated preamble or non dedicated preamble. Dedicated preambles are typically provided for a subset of SSBs/CSI RSs. If there is no SSB/CSI RS having DL Reference Signal Received Power (RSRP) above a threshold amongst the SSBs/CSI RSs for which contention free random access resources (i.e. dedicated preambles/ROs) are provided by the gNB, the UE select non dedicated preamble. Otherwise the UE select dedicated preamble. So during the RA procedure, one random access attempt can be the CFRA while other random access attempt can be the CBRA.

2 step contention based random access (2 step CBRA): In the first step, the UE transmits random access preamble on PRACH and a payload (i.e. MAC PDU) on PUSCH. The random access preamble and payload transmission is also referred as MsgA. In the second step, after MsgA transmission, the UE monitors for a response from the network (i.e., the gNB) within a configured window. The response is also referred as MsgB.

A next generation node B (gNB) transmits the MSGB on physical downlink shared channel (PDSCH). The PDCCH scheduling the PDSCH carrying MSGB is addressed to MSGB-radio network temporary identifier (MSGB-RNTI). The MSGB-RNTI is calculated as follows:

MSGB-RNTI=1+s_id+14*t_id+14*80*f_id+14*80*8*ul_carrier_id+14*80*8*2, where s_id is the index of the first orthogonal frequency division multiplexing (OFDM) symbol of the PRACH occasion where the UE has transmitted Msg1, i.e. RA preamble; 0≤s_id<14; t_id is the index of the first slot of the PRACH occasion (0≤t_id<80); fid is the index of the PRACH occasion within the slot in the frequency domain (0≤f_id<8), and ul_carrier_id is the UL carrier used for Msg1 transmission (0 for normal UL (NUL) carrier and 1 for a supplementary UL (SUL) carrier.

If the CCCH SDU was transmitted in the MsgA payload, the UE performs contention resolution using the contention resolution information in MsgB. The contention resolution is successful if the contention resolution identity received in MsgB matches first 48 bits of the CCCH SDU transmitted in the MsgA. If the C-RNTI was transmitted in the MsgA payload, the contention resolution is successful if the UE receives the PDCCH addressed to the C-RNTI. If contention resolution is successful, random access procedure is considered successfully completed. Instead of contention resolution information corresponding to the transmitted MsgA, the MsgB may include a fallback information corresponding to the random access preamble transmitted in the MsgA. If the fallback information is received, the UE transmits Msg3 and performs contention resolution using Msg4 as in CBRA procedure. If contention resolution is successful, random access procedure is considered successfully completed. If contention resolution fails upon fallback (i.e. upon transmitting Msg3), the UE retransmits MsgA. If configured window in which the UE monitor network response after transmitting MsgA expires and the UE has not received MsgB including contention resolution information or fallback information as explained above, the UE retransmits the MsgA. If the random access procedure is not successfully completed even after transmitting the MsgA configurable number of times, the UE fallbacks to 4 step RACH procedure, i.e. the UE only transmits the PRACH preamble.

The MsgA payload may include one or more of common control channel (CCCH) service data unit (SDU), dedicated control channel (DCCH) SDU, dedicated traffic channel (DTCH) SDU, buffer status report (BSR) MAC control element (CE), power headroom report (PHR) MAC CE, SSB information, C-RNTI MAC CE, or padding. MsgA may include the UE ID (e.g. random ID, S-TMSI, C-RNTI, resume ID, etc.) along with preamble in first step. The UE ID may be included in the MAC PDU of the MsgA. UE ID such as C-RNTI may be carried in the MAC CE, wherein MAC CE is included in the MAC PDU. Other UE IDs (such random ID, S-TMSI, C-RNTI, resume ID, etc.) may be carried in CCCH SDU. The UE ID can be one of random ID, S-TMSI, C-RNTI, resume ID, IMSI, idle mode ID, inactive mode ID, etc. The UE ID can be different in different scenarios in which the UE performs the RA procedure. When the UE performs RA after power on (before it is attached to the network), then the UE ID is the random ID. When the UE perform RA in IDLE state after it is attached to network, the UE ID is S-TMSI. If UE has an assigned C-RNTI (e.g. in connected state), the UE ID is C-RNTI. In case the UE is in INACTIVE state, the UE ID is a resume ID. In addition to the UE ID, some addition ctrl information can be sent in the MsgA. The control information may be included in the MAC PDU of the MsgA. The control information may include one or more of connection request indication, connection resume request indication, SI request indication, buffer status indication, beam information (e.g. one or more DL TX beam ID(s) or SSB ID(s)), beam failure recovery indication/information, data indicator, cell/BS/TRP switching indication, connection re-establishment indication, reconfiguration complete or handover complete message, etc.

2 step contention free random access (2 step CFRA): In this case the gNB assigns to the UE dedicated random access preamble (s) and PUSCH resource(s) for MsgA transmission. RO(s) to be used for preamble transmission may also be indicated. In the first step, the UE transmits random access preamble on PRACH and a payload on PUSCH using the contention free random access resources (i.e. dedicated preamble/PUSCH resource/RO). In the second step, after MsgA transmission, the UE monitors for a response from the network (i.e. gNB) within a configured window. If the UE receives PDCCH addressed to C-RNTI, random access procedure is considered successfully completed. If the UE receives fallback information corresponding to its transmitted preamble, random access procedure is considered successfully completed.

For certain events such has handover and beam failure recovery if dedicated preamble(s) and PUSCH resource(s) are assigned to the UE, during first step of random access i.e. during random access resource selection for MsgA transmission the UE determines whether to transmit dedicated preamble or non dedicated preamble. Dedicated preambles are typically provided for a subset of SSBs/CSI RSs. If there is no SSB/CSI RS having DL RSRP above a threshold amongst the SSBs/CSI RSs for which contention free random access resources (i.e. dedicated preambles/ROs/PUSCH resources) are provided by the gNB, the UE select non dedicated preamble. Otherwise, the UE select dedicated preamble. So during the RA procedure, one random access attempt can be 2 step CFRA while other random access attempt can be 2 step CBRA.

Upon initiation of random access procedure, the UE first selects the carrier (SUL or NUL). If the carrier to use for the Random Access procedure is explicitly signaled by the gNB, the UE select the signaled carrier for performing Random Access procedure. If the carrier to use for the Random Access procedure is not explicitly signaled by the gNB; and if the Serving Cell for the Random Access procedure is configured with supplementary uplink and if the RSRP of the downlink pathloss reference is less than rsrp-Threshold-SSB-SUL: the UE select the SUL carrier for performing Random Access procedure. Otherwise, the UE select the NUL carrier for performing Random Access procedure. Upon selecting the UL carrier, the UE determines the UL and DL BWP for random access procedure as specified in section 5.15 of TS 38.321. The UE then determines whether to perform 2 step or 4 step RACH for this random access procedure.

- If this random access procedure is initiated by PDCCH order and if the ra-PreambleIndex explicitly provided by PDCCH is not 0b000000, UE selects 4 step RACH.
- else if 2 step contention free random access resources are signaled by the gNB for this random access procedure, the UE selects 2 step RACH.
- else if 4 step contention free random access resources are signaled by the gNB for this random access procedure, the UE selects 4 step RACH.
- else if the UL BWP selected for this random access procedure is configured with only 2 step RACH resources, the UE selects 2 step RACH.
- else if the UL BWP selected for this random access procedure is configured with only 4 step RACH resources, the UE selects 4 step RACH.
- else if the UL BWP selected for this random access procedure is configured with both 2 step and 4 step RACH resources,
  if RSRP of the downlink pathloss reference is below a configured threshold, UE selects 4 step RACH. Otherwise, the UE selects 2 step RACH.

In 5G wireless communication system, small data transmission (SDT) in RRC INACTIVE is supported. The uplink data can be transmitted in Msg3 in case of 4 step RA procedure and in MsgA in case of 2 step RA procedure.

FIG. 1 is a flow chart illustrating small data transmission using 4 step RA according to an embodiment of the disclosure.

Referring to FIG. 1, criteria to initiate 4 step RA for SDT is met. The UE may select preamble/RO from preambles/ROs for SDT. In operation 101, the UE may transmit, to the gNB, random access preamble. In operation 103, the UE may receive, from the gNB, the RAR including the UL grant for Msg3 transmission.

In operation 105, the UE may transmit an RRCResumeRequest/RRCResumeRequest1 to the gNB (same as the last serving GNB) on SRB 0. The RRCResumeRequest/RRCResumeRequest1 may include full/short I-RNTI (resumeIdentity), the resume cause (resumeCause), and an authentication token (resumeMAC-I).

The I-RNTI (short or full I-RNTI) is used for context identification and a value of the I-RNTI shall be the same as a value of the I-RNTI that the UE had received from the last serving gNB in the RRCRelease with suspendConfig message.

The ResumeMAC-I is a 16-bit message authentication token, the UE shall calculate the ResumeMAC-I using the integrity algorithm (NIA or EIA) in the stored AS security context, which was negotiated between the UE and the last serving gNB, and the KRRCint from the stored AS security context with the following inputs:
  KEY: it shall be set to current KRRCint;
    BEARER: all its bits shall be set to 1.
    DIRECTION: its bit shall be set to 1;
    COUNT: all its bits shall be set to 1;
    MESSAGE: it shall be set to VarResumeMAC-Input with
      following inputs:
    source PCI (set to the physical cell identity of the PCell
      the UE was connected to prior to suspension of the
      RRC connection)
    target Cell-ID (Set to the cellIdentity of the first PLMN-Identity included in the PLMN-IdentityInfoList broadcasted in SIB1 of the target cell i.e. the cell to which the UE is sending small data)
    source C-RNTI (Set to C-RNTI that the UE had in the PCell it was connected to prior to suspension of the RRC connection).

The UE may resume signaling radio bearer (SRB)(s) and data radio bearer (DRB)(s), may derive new security keys using the NextHopChainingCount provided in the RRCRelease message of the previous RRC connection and may re-establish the AS security. The user data are ciphered and protected with integrity (Only for DRBs configured with UP integrity protection) and transmitted on dedicated traffic channel (DTCH) multiplexed with the RRCResumeRequest/RRCResumeRequest1 message on common control channel (CCCH)/CCCH1.

In operation 107, the gNB may validate the resumeMAC-I and may deliver the uplink data to user plane function (UPF).

In operation 109, the UPF may transmit, to the gNB, downlink data.

In operation 111, the gNB may transmit, to the UE, the RRCRelease message to keep the UE in RRC_INACTIVE. PDCCH is addressed to temporary cell-RA radio network temporary identifier (TC-RNTI). If downlink data is available, the downlink data are sent ciphered and protected with integrity (Only for DRBs configured with UP integrity protection) on DTCH multiplexed with the RRCRelease message on DCCH.

Figure 2:
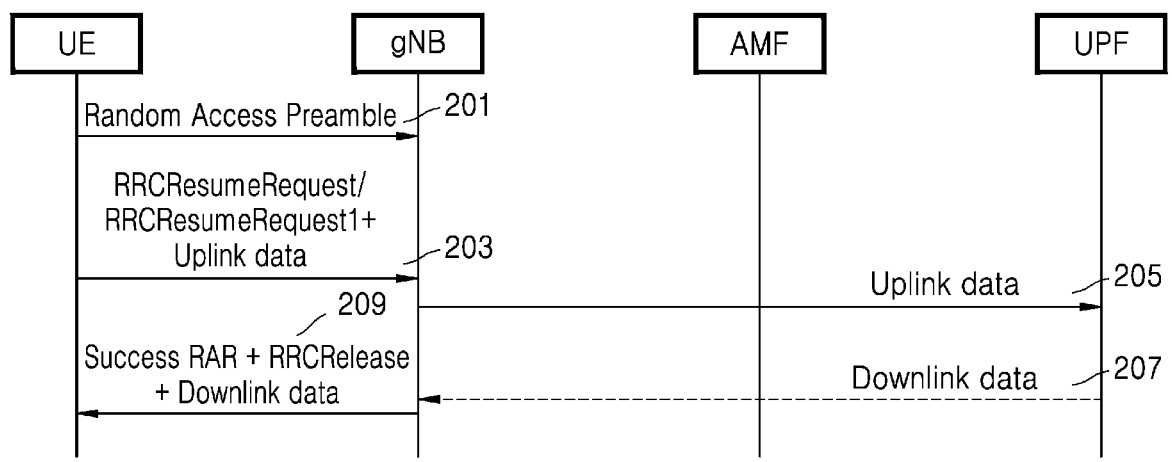
FIG. 2 is a flow chart illustrating small data transmission using 2 step RA according to an embodiment of the disclosure.

FIG. 2 is a flow chart illustrating small data transmission using 2 step RA according to an embodiment of the disclosure.

Referring to FIG. 2, criteria to initiate 2 step RA for SDT is met. The UE may select preamble/RO/PO from preambles/ROs/POs for SDT. In operation 201, the UE may transmit, to the gNB, random access preamble.

In operation 203, in the MsgA payload, the UE may transmit an RRCResumeRequest/RRCResumeRequest1 to the gNB (same as the last serving GNB) on SRB 0. The RRCResumeRequest/RRCResumeRequest1 includes full/short I-RNTI (resumeIdentity), the resume cause (resumeCause), and an authentication token (resumeMAC-I).

The I-RNTI (short or full I-RNTI) is used for context identification and a value of the I-RNTI shall be the same as a value of the I-RNTI that the UE had received from the last serving gNB in the RRCRelease with suspendConfig message. The ResumeMAC-I is a 16-bit message authentication token, the UE shall calculate the ResumeMAC-I using the integrity algorithm (NIA or EIA) in the stored AS security context, which was negotiated between the UE and the last serving gNB, and the KRRCint from the stored AS security context with the following inputs:

KEY: it shall be set to current KRRCint;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE may resume all SRBs and DRBs, may derive new security keys using the NextHopChainingCount provided in the RRCRelease message of the previous RRC connection and may re-establish the AS security. The user data are ciphered and protected with integrity (Only for DRBs configured with UP integrity protection) and transmitted on DTCH multiplexed with the RRCResumeRequest/RRCResumeRequest1 message on CCCH/CCCH1.

In operation 205, the gNB may validate the resumeMAC-I and may deliver the uplink data to UPF.

In operation 207, the UPF may transmit, to the gNB, downlink data.

In operation 209, the gNB may transmit, to the UE, the RRCRelease message to keep the UE in RRC_INACTIVE in MsgB along with successRAR. PDCCH is addressed to C-RNTI. If downlink data is available, the downlink data is sent ciphered and protected with integrity (Only for DRBs configured with UP integrity protection) on DTCH multiplexed with the RRCRelease message on DCCH.

In case of small data transmission using 4 step RA, upon receiving preamble for SDT, the network may not have enough UL resources for small data transmission. If the network does not transmit RAR, the UE will keep retransmitting RA preambles. The similar situation can occur, in case of small data transmission using 2 step RA wherein the network fails to receive MsgA MAC PDU and receives only preamble.

For RACH based SDT solutions, RACH Occasions (ROs) for PRACH initiated for SDT and non SDT can be shared or not shared (depending on network configuration). In a case where ROs for SDT and non SDT are shared, back off indication in RAR is common for SDT and non SDT. (Note: Same RO means, same RA-RNTI and hence the UE performing SDT and non SDT receives the same RAR). Both the UEs performing RACH for SDT and non SDT will apply the same back off. As a result, SDT can be delayed.

RA Prioritization for SDT

Figure 3:
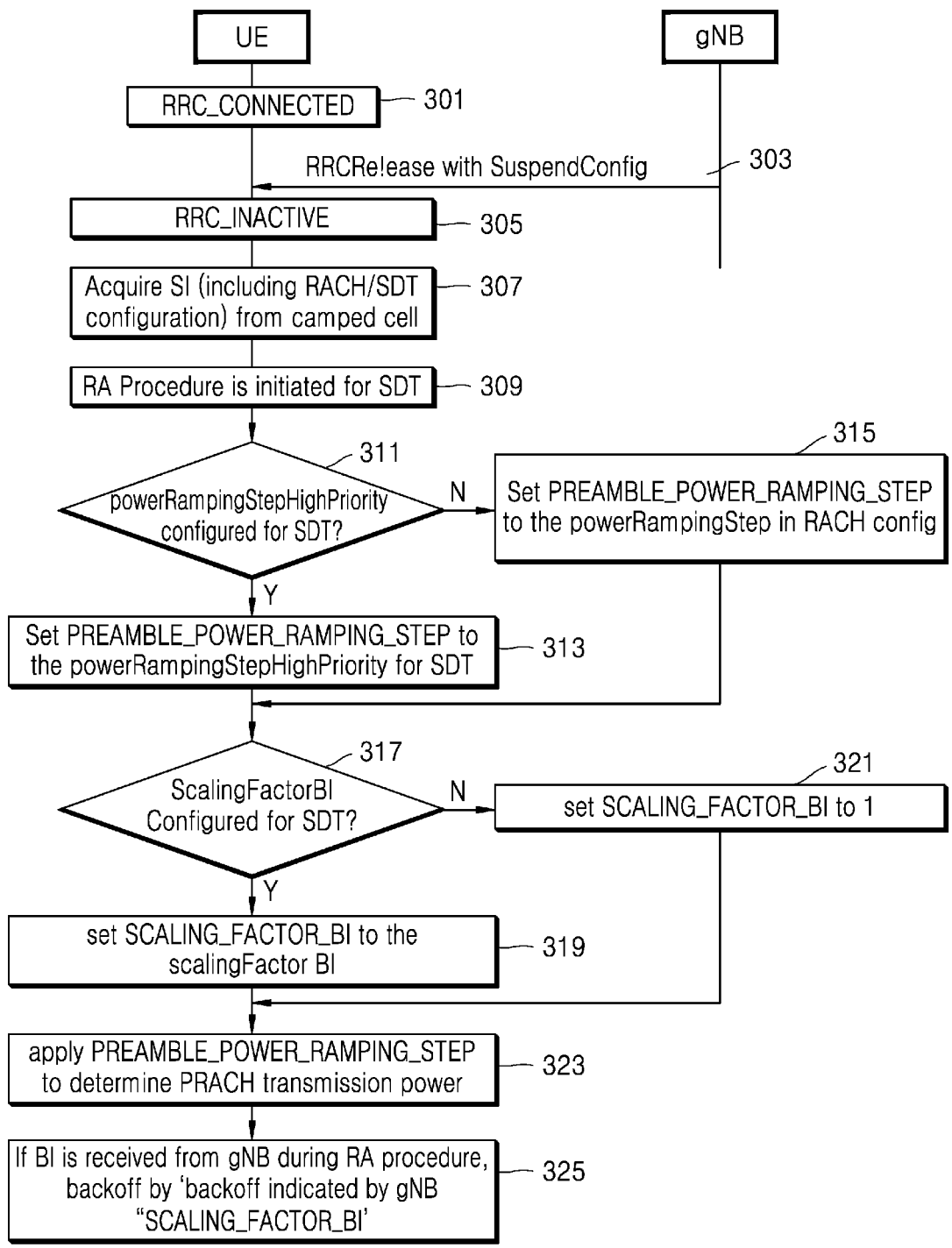
FIG. 3 is a flowchart illustrating a method performed by user equipment (UE) for RA prioritization for SDT according to an embodiment of the disclosure.

Method 1:

In method of this disclosure UE operation for RA prioritization for SDT is illustrated in FIG. 3.

FIG. 3 is a flowchart illustrating a method for RA prioritization for SDT according to an embodiment of the disclosure.

Referring to FIG. 3, in operation 301, the UE is in RRC_CONNECTED state.

In operation 303, in the RRC_CONNECTED, the UE may receive RRCRelease with suspend configuration from the gNB.

In operation 305, upon receiving the RRCRelease with suspend configuration the UE may enter RRC INACTIVE state and perform the following operations: the UE may reset MAC and release the default MAC Cell Group configuration, if any. The UE may re-establish RLC entities for SRB1. The UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may also store next hopping chain count (NCC) and other parameters received in RRCRelease message. The UE may suspend all SRB(s) and DRB(s), except SRB0.

In operation 307, during the RRC INACTIVE, the UE may acquire the system information (SI) from the camped cell. A parameter powerRampingStepHighPriority and a parameter scalingFactorBI are optionally signaled by the gNB in SI for SDT using RA procedure (or for use during the RA procedure initiated for SDT). These parameters are separately signaled for 2 step RACH configuration for SDT and 4 step RACH configuration for SDT. The network may signal the powerRampingStepHighPriority and/or the scalingFactorBI for both 2 step RA based SDT and 4 step RA based SDT or may signal the powerRampingStepHighPriority and/or the scalingFactorBI for only one of 2 step RA based SDT and 4 step RA based SDT or may not configure the powerRampingStepHighPriority and/or the scalingFactorBI for both 2 step RA based SDT and 4 step RA based SDT. It is to be noted that parameters powerRampingStepHighPriority and scalingFactorBI for RA based SDT are different from powerRampingStepHighPriority and scalingFactorBI signaled by the gNB for RA initiated for reasons (e.g. initial access, handover, beam failure recovery, SI acquisition, RRC Re-establishment, etc.) other than SDT.

In an embodiment, instead of the SI, the above parameters can be signaled in the RRCRelease message.

In operation 309, during the RRC_INACTIVE, UE may initiate RRC connection resumption for small data transmission or initiate small data transmission procedure when criteria to perform the small data transmission is met. RRC connection resumption for small data transmission may also be referred as small data transmission procedure. The UE may then initiate the RA procedure for the small data transmission. Upon initiation of RA procedure UE selects the UL carrier, BWP on selected UL carrier and RA type (2 step or 4 step) as explained earlier in this disclosure.

In operation 311, the UE may identify whether the parameter powerRampingStepHighPriority is configured (i.e. received from the gNB) for the SDT. If random access is based on 2 step RA, the UE may identify whether the parameter powerRampingStepHighPriority is configured (i.e. received from the gNB) for the SDT for 2 step RA. If random access is based on 4 step RA, the UE may identify whether the parameter powerRampingStepHighPriority is configured (i.e. received from the gNB) for the SDT for 4 step RA.

If the powerRampingStepHighPriority is configured for the SDT for the RA type selected upon initiation of the random access procedure ('Yes' in operation 311), in operation 313, the UE may set a parameter PREAMBLE_POWER_RAMPING_STEP to the powerRampingStepHighPriority for SDT for the RA type selected upon initiation of the random access procedure. For example, the UE may set a value of the parameter PREAMBLE_POWER_RAMPING_STEP as a value of the parameter powerRampingStepHighPriority.

If the parameter powerRampingStepHighPriority is not configured for the SDT for the RA type selected upon initiation of the random access procedure ('No' in operation 311), in operation 315, the UE may set the parameter PREAMBLE_POWER_RAMPING_STEP to a parameter powerRampingStep configured in RACH configuration. In case of 2 step RACH, the RACH configuration refers to RACH configuration of 2 step RA (or 2 step RA for SDT) and in case of 4 step RACH, the RACH configuration refers to 4 step RA (or 4 step RA for SDT). For example, the UE may set the value of the parameter PREAMBLE_POWER_RAMPING_STEP as a value of the parameter powerRampingStep configured in the RACH configuration According to another embodiment of the disclosure, if the parameter powerRampingStepHighPriority is configured for the SDT for the RA type selected upon initiation of the random access procedure, the UE may set the parameter PREAMBLE_POWER_RAMPING_STEP to the parameter powerRampingStepHighPriority for the SDT. If random access is based on 2 step RA, parameter powerRampingStepHighPriority for the SDT is for 2 step RA. If random access is based on 4 step RA, parameter powerRampingStepHighPriority for the SDT is for 4 step RA.

In a case where the parameter powerRampingStepHighPriority is not configured for the SDT for the RA type selected upon initiation of the random access procedure, if an access identity of the UE is 1 or 2 (access identity corresponds to MPS/MCS services) and the parameter powerRampingStepHighPriority is configured for the corresponding access identity, the UE may set the parameter PREAMBLE_POWER_RAMPING_STEP to the parameter powerRampingStepHighPriority corresponding to the access identity.

In a case where the parameter powerRampingStepHighPriority is not configured for the SDT (or in a case where the parameter powerRampingStepHighPriority is not configured for the SDT for RA type of random access procedure), if the access identity of the UE is 1 or 2 (access identity corresponds to MPS/MCS services) and the parameter powerRampingStepHighPriority is not configured for the corresponding access identity, the UE may set the parameter PREAMBLE_POWER_RAMPING_STEP to the parameter powerRampingStep configured in the RACH configuration. In case of 2 step RACH, the RACH configuration refers to RACH configuration of 2 step RA (or 2 step RA for SDT). In case of 4 step RACH, the RACH configuration refers to 4 step RA (or 4 step RA for SDT).

In operation 317, the UE may identify whether the parameter scalingFactorBI is configured (i.e. received from the gNB) for the SDT. If random access is based on 2 step RA, the UE identify whether the parameter scalingFactorBI is configured (i.e. received from the gNB) for the SDT for 2 step RA. If random access is based on 4 step RA, the UE identify whether the parameter scalingFactorBI is configured (i.e. received from the gNB) for the SDT for 4 step RA.

If the scalingFactorBI is configured for SDT ('Yes' in operation 317), in operation 319, the UE may set a parameter SCALING_FACTOR_BI to the parameter scalingFactorBI for the SDT. For example, the UE may set a value of the parameter SCALING_FACTOR_BI as a value of the parameter scalingFactorBI for the SDT. If random access is based on 2 step RA, parameter scalingFactorBI for the SDT is for 2 step RA. If random access is based on 4 step RA, parameter scalingFactorBI for the SDT is for 4 step RA.

If the scalingFactorBI is not configured for SDT ('No' in operation 317), in operation 321, the UE may set the parameter SCALING_FACTOR_BI to 1. For example, the UE may set the value of the parameter SCALING_FACTOR_BI as a value of "1".

In accordance with another embodiment of the disclosure, if the parameter scalingFactorBI is configured for the SDT, the UE may set the parameter SCALING_FACTOR_BI to the parameter scalingFactorBI for the SDT.

In a case where the parameter scalingFactorBI is not configured for the SDT (In a case where the parameter scalingFactorBI is not configured for the SDT for RA type of random access procedure), if the access identity of the UE is 1 or 2 (access identity corresponds to MPS/MCS services) and the parameter scalingFactorBI is configured for the corresponding access identity, the UE may set the parameter SCALING_FACTOR_BI to the parameter scalingFactorBI corresponding to the access identity. For example, the UE may set a value of the parameter SCALING_FACTOR_BI to a value of the parameter scalingFactorBI corresponding to the access identity.

In the case where the parameter scalingFactorBI is not configured for the SDT, if the access identity of the UE is 1 or 2 (access identity corresponds to MPS/MCS services) and the parameter scalingFactorBI is not configured for the corresponding access identity, the UE may set the parameter SCALING_FACTOR_BI to 1. For example, the UE may set a value of the parameter SCALING_FACTOR_BI to a value of "1".

In operation 323, during the random access procedure, the UE may apply the parameter PREAMBLE_POWER_RAMPING_STEP to determine the PRACH transmission power as specified in TS 38.321.

In operation 325, if a backoff indicator (BI) is received from the gNB during the RA procedure (e.g. in RAR in case of 4 step RA or in MsgB in case of 2 step RA), the UE may set a parameter PREAMBLE_BACKOFF to a value of the backoff value corresponding to received BI multiplied with a value of the parameter SCALING_FACTOR_BI. A predefined table provides backoff value corresponding to each BI.

During the 4 step random access procedure, if RAR window expiry or contention resolution timer expiry occurs before performing preamble retransmission, the UE may select a random backoff time according to a uniform distribution between 0 and the parameter PREAMBLE BACK-OFF. After the backoff time, the UE may perform preamble retransmission. Note that the UE may start RAR window for receiving RAR upon transmitting the random access preamble and start the contention resolution timer upon transmitting Msg3 in the UL grant received in the RAR, as explained earlier in this disclosure.

During the 2 step random access procedure, if the MsgB window expiry or contention resolution timer expiry occurs before performing MsgA retransmission, the UE may select a random backoff time according to a uniform distribution between 0 and the parameter PREAMBLE_BACKOFF. After the backoff time, the UE may perform MsgA retransmission. Note that the UE may start MsgB window for receiving MsgB upon transmitting the MsgA and start the contention resolution timer upon transmitting Msg3 in UL grant received in fallbackRAR received in MsgB, as explained earlier in this disclosure.

UE operation for RA prioritization for SDT in accordance with another embodiment of the disclosure is explained below.

The UE is in RRC_CONNECTED state. In the RRC_CONNECTED, UE may receive RRCRelease with suspend configuration.

Upon receiving the RRCRelease with suspend configuration, the UE may enter RRC_INACTIVE and perform the following operations: The UE may reset MAC and release the default MAC Cell Group configuration, if any. The UE may re-establish RLC entities for SRB 1. The UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may also store next hopping chain count (NCC) and other parameters received in RRCRelease message.

The UE may suspend all SRB(s) and DRB(s), except SRB0.

During the RRC_INACTIVE, the UE may acquire the SI from the camped cell. The parameter powerRampingStepHighPriority and the parameter scalingFactorBI are optionally signaled by the gNB in SI for the SDT using the RA procedure. These parameters are separately signaled for the 2 step RACH configuration for the SDT and the 4 step RACH configuration for the SDT. The network (i.e. gNB) may signal the parameter powerRampingStepHighPriority and/or the parameter scalingFactorBI for both 2 step RA based SDT and 4 step RA based SDT or may signal the parameter powerRampingStepHighPriority and/or the parameter scalingFactorBI for only one of 2 step RA based SDT and 4 step RA based SDT or may not configure the parameter powerRampingStepHighPriority and/or the parameter scalingFactorBI for both 2 step RA based SDT and 4 step RA based SDT. It is to be noted that parameters powerRampingStepHighPriority and scalingFactorBI for RA based SDT are different from powerRampingStepHighPriority and scalingFactorBI signaled by the gNB for RA initiated for reasons (e.g. initial access, handover, beam failure recovery, SI acquisition, RRC Re-establishment, etc.) other than SDT.

In an embodiment, instead of the SI, the above parameters can be signaled in RRCRelease message.

During the RRC_INACTIVE, the UE may initiate RRC connection resumption for the small data transmission when criteria to perform the small data transmission is met. The UE may initiate RA procedure (2 step RA or 4 step RA) for the small data transmission. Upon initiation of RA procedure UE may select the UL carrier, BWP on selected UL carrier and RA type (2 step or 4 step) as explained earlier in this disclosure.

The UE may identify whether ra-prioritization parameters are configured for the SDT. For example, the ra-prioritization parameters may include the parameter powerRampingStepHighPriority and/or the parameter scalingFactorBI.

if ra-prioritization parameters are configured for the SDT for RA type of the random access procedure and the parameter powerRampingStepHighPriority is configured for the SDT (i.e. included in ra-prioritization parameters for SDT for RA type of the random access procedure), UE may set the parameter PREAMBLE_POWER_RAMPING_STEP to the parameter powerRampingStepHighPriority for the SDT. For example, the UE may set a value of the parameter PREAMBLE_POWER_RAMPING_STEP as a value of the parameter powerRampingStepHighPriority for the SDT for RA type of the random access procedure.

If ra-prioritization parameters are configured for the SDT for RA type of the random access procedure and the parameter powerRampingStepHighPriority is not configured for the SDT (i.e. not included in ra-prioritization parameters of SDT for RA type of the random access procedure), the UE may set the parameter PREAMBLE_POWER_RAMPING_STEP to the parameter powerRampingStep configured in RACH configuration. In case of 2 step RACH, the RACH configuration refers to RACH configuration of 2 step RA (or 2 step RA for SDT). In case of 4 step RACH, the RACH configuration refers to 4 step RA (or 4 step RA for SDT).

If ra-prioritization parameters are configured for the SDT for RA type of the random access procedure and the parameter scalingFactorBI is configured for the SDT (i.e. included in ra-prioritization parameters of SDT for RA type of the random access procedure), the UE may set the parameter SCALING_FACTOR_BI to the parameter scalingFactorBI for the SDT for RA type of the random access procedure.

If ra-prioritization parameters are configured for the SDT for RA type of the random access procedure and the parameter scalingFactorBI is not configured for the SDT (i.e. not included in ra-prioritization parameters of SDT for RA type of the random access procedure), the UE may set the parameter SCALING FACTOR BI to 1.

If ra-prioritization parameters are not configured for the SDT for RA type of the random access procedure, the UE may identify whether an access identity of the UE is 1 or 2 and ra-prioritization parameters corresponding to the access identity of the UE are configured.

If the access identify of the UE is 1 or 2 and a parameter powerRampingStepHighPriority is configured for the access identity of the UE, the UE may set the parameter PREAMBLE_POWER_RAMPING_STEP to the parameter powerRampingStepHighPriority corresponding to the access identity of the UE.

If the access identify of the UE is 1 or 2 and the parameter powerRampingStepHighPriority is not configured for the access identity of the UE, the UE may set the parameter PREAMBLE_POWER_RAMPING_STEP to the parameter powerRampingStep configured in the RACH configuration. In case of 2 step RACH, the RACH configuration refers to RACH configuration of 2 step RA (or 2 step RA for SDT). In case of 4 step RACH, the RACH configuration refers to 4 step RA (or 4 step RA for SDT).

If the access identify of the UE is 1 or 2 and a parameter scalingFactorBI is configured for the access identity of the UE, the UE may set the parameter SCALING_FACTOR_BI to the parameter scalingFactorBI corresponding to the access identity of the UE.

If the access identify of the UE is 1 or 2 and the parameter scalingFactorBI is configured for the access identity of the UE, the UE may set the parameter SCALING_FACTOR_BI to 1.

During the random access procedure, the UE may apply the parameter PREAMBLE_POWER_RAMPING_STEP to determine the PRACH transmission power as specified in TS 38.321.

If the BI is received from the gNB during the RA procedure (e.g. in RAR in case of 4 step RA or in MsgB in case of 2 step RA), the UE may set the parameter PREAMBLE_BACKOFF to value of the backoff value corresponding to received BI multiplied with a value of the parameter SCALING_FACTOR_BI. A pre-defined table provides backoff value corresponding to each BI.

During the 4 step random access procedure, if RAR window expiry or contention resolution timer expiry occurs before performing preamble retransmission, the UE may select a random backoff time according to a uniform distribution between 0 and the parameter PREAMBLE_BACKOFF. After the backoff time, the UE may perform the preamble retransmission.

During the 2 step random access procedure, if MsgB window expiry or contention resolution timer expiry occurs before performing MsgA retransmission, the UE may select a random backoff time according to a uniform distribution between 0 and the parameter PREAMBLE_BACKOFF. After the backoff time, the UE may perform the MsgA retransmission.

Figure 4:
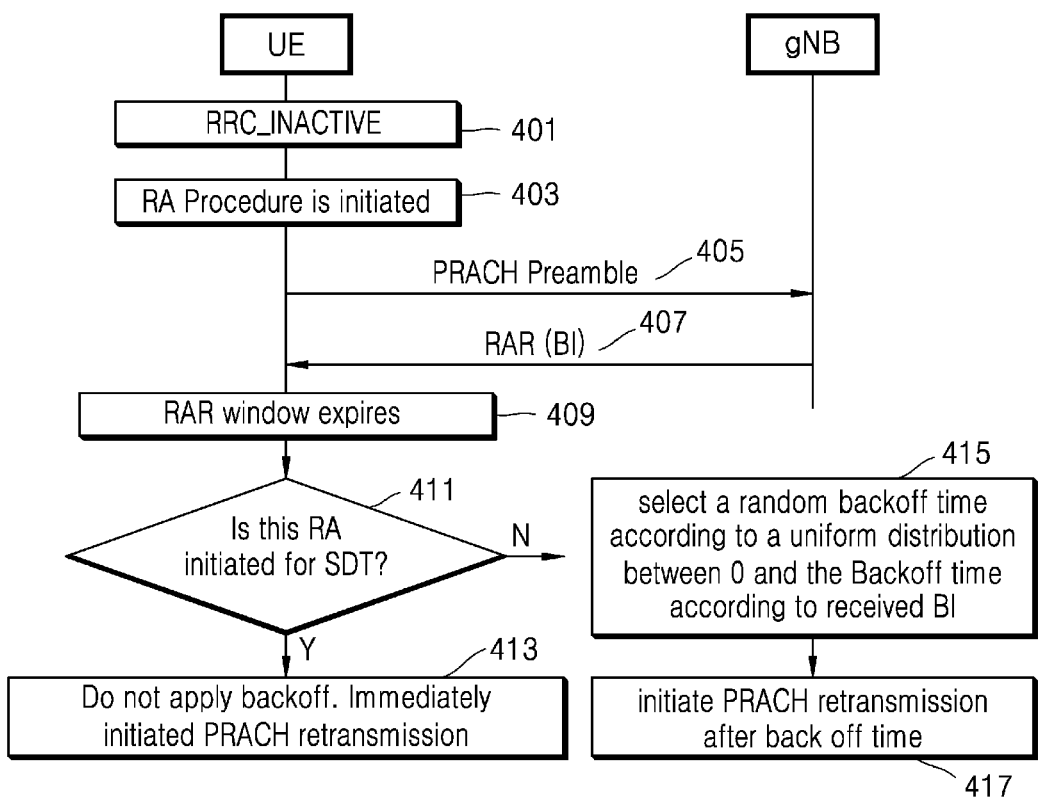
FIG. 4 is a flowchart illustrating RA prioritization for small data transmission according to an embodiment of the disclosure.

Method 2:

UE operation for RA prioritization for the SDT in accordance with another embodiment of the disclosure is as follows:

FIG. 4 is a flowchart illustrating RA prioritization for small data transmission according to an embodiment of the disclosure.

The UE is in the RRC_CONNECTED state. In the RRC_CONNECTED, the UE may receive RRCRelease with suspend configuration.

Referring to FIG. 4, in operation 401, upon receiving the RRCRelease with suspend configuration the UE may enter RRC_INACTIVE and perform the following operations: The UE may reset MAC and release the default MAC Cell Group configuration, if any. The UE may re-establish RLC entities for SRB1. The UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may also store next hopping chain count (NCC) and other parameters received in RRCRelease message. The UE may suspend all SRB(s) and DRB(s), except SRB0.

During the RRC_INACTIVE, in operation 403, the UE may initiate a random access (RA) procedure.

In operation 405, the UE may transmit, to the gNB, PRACH preamble in case of 4 step RA procedure and MsgA in case of 2 step RA procedure.

In operation 407, the UE may receive, from the gNB, RAR including information associated with BI.

In operation 409, the RAR window expiry or the MsgB window expiry may occur. For example, the RAR window expiry and the MsgB window expiry may correspond to the 4 step random access procedure and the 2 step random access procedure, respectively. Note that the UE may start RAR window for receiving RAR upon transmitting the random access preamble and start the contention resolution timer upon transmitting Msg3 in UL grant received in RAR, as explained earlier in this disclosure. The UE may start MsgB window for receiving MsgB upon transmitting the MsgA and start the contention resolution timer upon transmitting Msg3 in UL grant received in fallbackRAR received in MsgB, as explained earlier in this disclosure.

In operation 411, the UE may identify whether the RA procedure in operation 403 is initiated for the SDT.

In operation 413, during the 4 step random access procedure, in a case where RAR window expiry or contention resolution timer expiry occurs, if random access procedure is initiated for the SDT and the UE has not yet performed the maximum number of allowed RA attempts ('Yes' in operation 411), the UE may not perform backoff before performing preamble retransmission.

In the case where RAR window expiry or contention resolution timer expiry occurs, if the random access procedure is not initiated for the SDT and the UE has not yet performed the maximum number of allowed RA attempts ('No' in operation 411), in operation 415, the UE may select a random backoff time according to a uniform distribution between 0 and the PREAMBLE_BACKOFF.

In operation 417, after the backoff time, the UE may perform preamble retransmission.

During the 2 step random access procedure, in a case where MsgB window expiry or contention resolution timer expiry occurs, if random access procedure is initiated for the SDT and the UE has not yet performed the maximum number of allowed RA attempts, the UE may not perform backoff before performing MsgA retransmission.

In the case where MsgB window expiry or contention resolution timer expiry occurs, if random access procedure is not initiated for the SDT and the UE has not yet performed the maximum number of allowed RA attempts, the UE may select a random backoff time according to a uniform distribution between 0 and the PREAMBLE_BACKOFF. After the backoff time, the UE may perform the MsgA retransmission.

Upon transmission of random access preamble for the SDT, if the UE receives RAR/MsgB (including BI subheader), the UE may ignore the BI. In an embodiment, whether the UE ignores the BI can be indicated by the network (i.e. gNB) in the RACH configuration for the SDT or in the RRC Release message.

If the RAR including the BI subheader indicates the UE to skip the backoff, the UE may perform the PRACH retransmission without backoff upon RAR window expiry or contention resolution timer expiry If the MsgA including the BI subheader indicates the UE to skip the backoff, the UE may perform the MsgA retransmission without backoff upon RAR window expiry or contention resolution timer expiry.

Fallback/Switching to non SDT RA

Figure 5A:
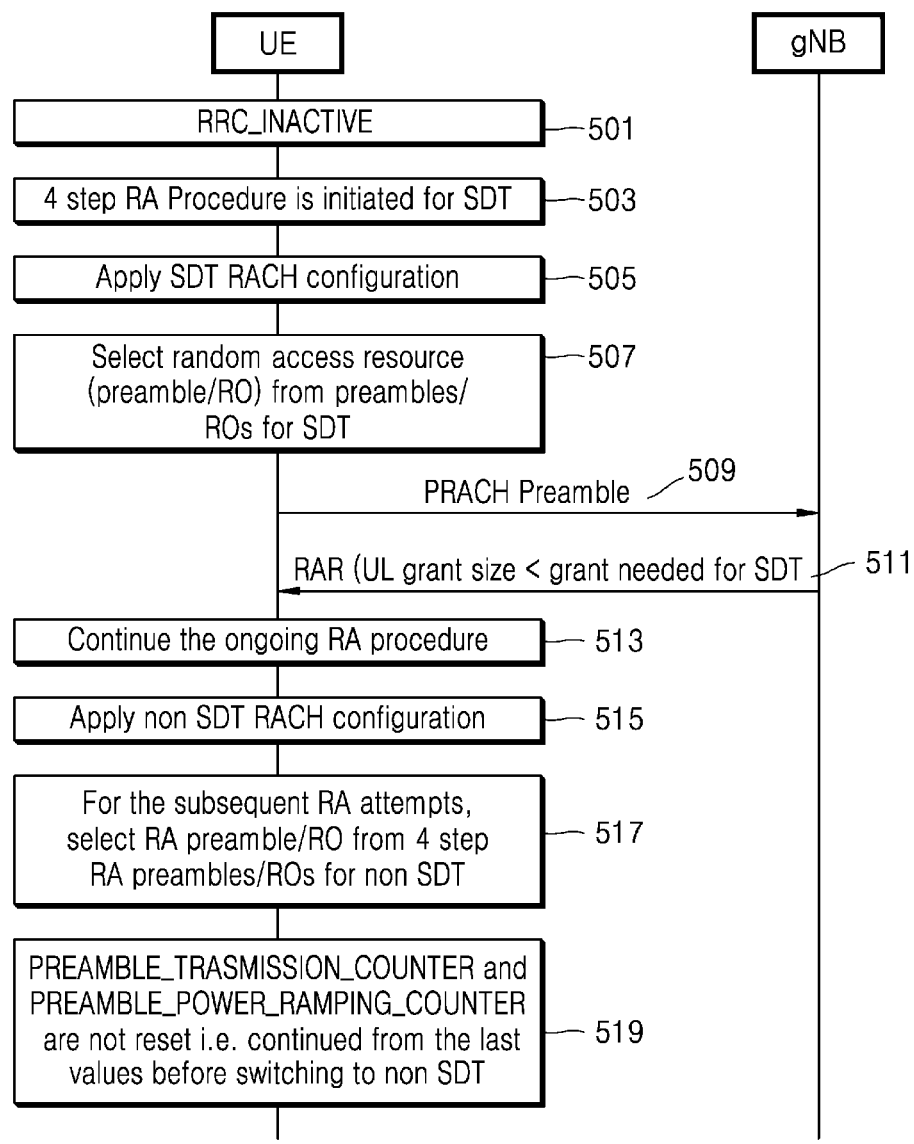
FIG. 5A is a flowchart illustrating a method for switching to random access for non-small data transmission according to an embodiment of the disclosure.

Method 1:

FIG. 5A is a flowchart illustrating a method for switching to random access for non-small data transmission according to an embodiment of the disclosure.

Figure 5B:
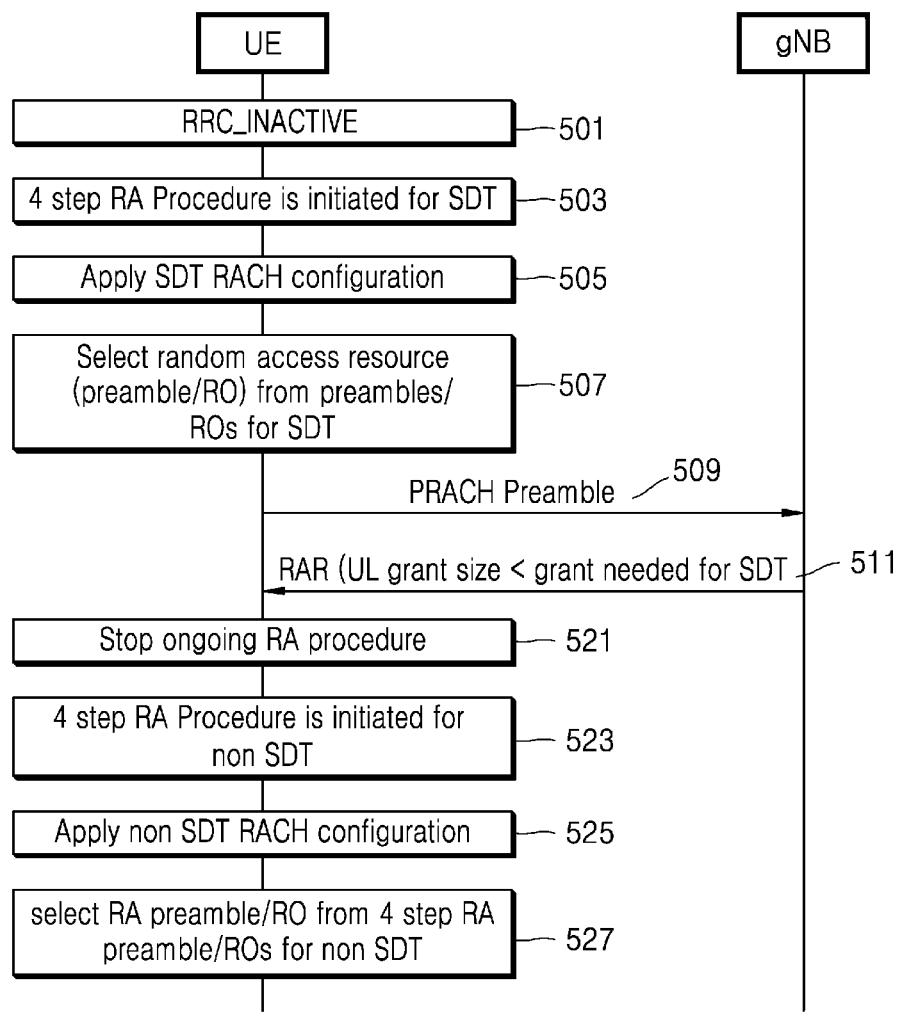
FIG. 5B is a flowchart illustrating a method for switching to random access for non-small data transmission according to an embodiment of the disclosure.

FIG. 5B is a flowchart illustrating a method for switching to random access for non-small data transmission according to an embodiment of the disclosure.

UE is in RRC_CONNECTED. In the RRC_CONNECTED, UE receives RRCRelease with suspend configuration.

Referring to FIG. 5A, in operation 501, the UE may enter RRC_INACTIVE.

During the RRC_INACTIVE, the UE initiates RRC connection resumption for small data transmission when criteria to perform small data transmission is met (e.g. RSRP is above a threshold and available data volume for transmission is smaller than a threshold). In operation 503, the UE may initiate 4 step RA procedure for the small data transmission. Upon initiation of RA procedure, the UE may select the UL carrier, BWP on selected UL carrier and RA type (2 step or 4 step) as explained earlier in this disclosure. In operation 505, the UE may apply SDT RACH configuration. The UE may initialize PREAMBLE_TRANSMISSION_COUNTER to 1. PREAMBLE_POWER_RAMPING_COUNTER to 1.

In operation 507, the UE may select random access resource. For example, the UE may identify an SSB from SSBs transmitted in camped cell. The identified SSB is the one whose SS-RSRP is above a threshold or any SSB can be used if there is no SSB whose SS-RSRP is above a threshold. The UE may identify a preamble corresponding to identified SSB from the preambles for the SDT. The UE may identify RACH occasion (RO) corresponding to identified SSB from ROs for the SDT.

In operation 509, the UE may transmit, to the gNB, RA preamble using RACH resources/preambles configured for the SDT. The preamble transmission power is determined based on PREAMBLE_POWER_RAMPING_COUNTER and PREAMBLE_TRANSMISSION_COUNTER. The UE may then monitor for PDCCH addressed to RA-RNTI in response window for receiving RAR.

In operation 511, the UE may receive, from the gNB, UL grant in RAR (RAR is received in DL TB scheduled by PDCCH addressed to RA-RNTI). Note that if RAR is not received and response window expires, the UE may increment PREAMBLE_TRANSMISSION_COUNTER and perform operation 507 and 509. The UE may also increment PREAMBLE_POWER_RAMPING_COUNTER if SSB selected at operation 507 is not changed from the SSB identified in last preamble transmission.

If the size of UL grant received in RAR is less than the MAC PDU size determined at the time of selecting SDT:

the UE may cancel the SDT procedure (or cancel connection resume procedure initiated for SDT) and may proceed with normal connection resume (i.e. uplink data is not transmitted in Msg3 MAC PDU and only resume message is transmitted in Msg3 MAC PDU). As part of cancellation of SDT procedure, the UE may suspend the SRB 2 and DRBs, if they were resumed when SDT procedure was initiated. The UE may also stop the timer started upon initiation of SDT procedure and start the timer for connection resume procedure i.e. T319.

Msg3 MAC PDU if already generated is rebuilt (UL data is deprioritized i.e. removed from MAC PDU) and transmitted in received UL grant. The UE may start contention resolution timer. If the contention resolution timer expires, one of the following can be performed:

Option 1 (FIG. 5A):

In operation 513, the UE may continue the ongoing RA procedure.

In operation 515, non SDT RACH configuration is applied.

In operation 517, however, for the subsequent RA attempt, the UE may select RA preamble/RO from 4 step RA preambles/ROs for non SDT (i.e. from RACH configuration for non SDT).

In operation 519, a parameter PREAMBLE_TRANSMISSION_COUNTER and a parameter PREAMBLE_POWER_RAMPING_COUNTER are not reset. For example, the parameter PREAMBLE_TRANSMISSION_COUNTER and the parameter PREAMBLE_POWER_RAMPING_COUNTER may be continued from last values before switching to non-SDT.

Option 2 (FIG. 5B):

Referring to FIG. 5B, operations 501 to 511 in FIG. 5B are the same as FIG. 5A.

In operation 521, the UE may stop the ongoing RA procedure.

In operation 523, the UE may initiate the new RA procedure using Non SDT RACH configuration.

In operation 525, the UE may apply the Non SDT RACH configuration.

In operation 527, the UE may select RA preamble/RO from 4 step RA preambles/ROs for non SDT.

The content of Msg3 MAC PDU which is already built during the ongoing RA procedure can be used to generate Msg3 MAC PDU for new RA procedure. Alternatively, RRC can generate the resume message again which is transmitted in MsgA.

Figure 6:
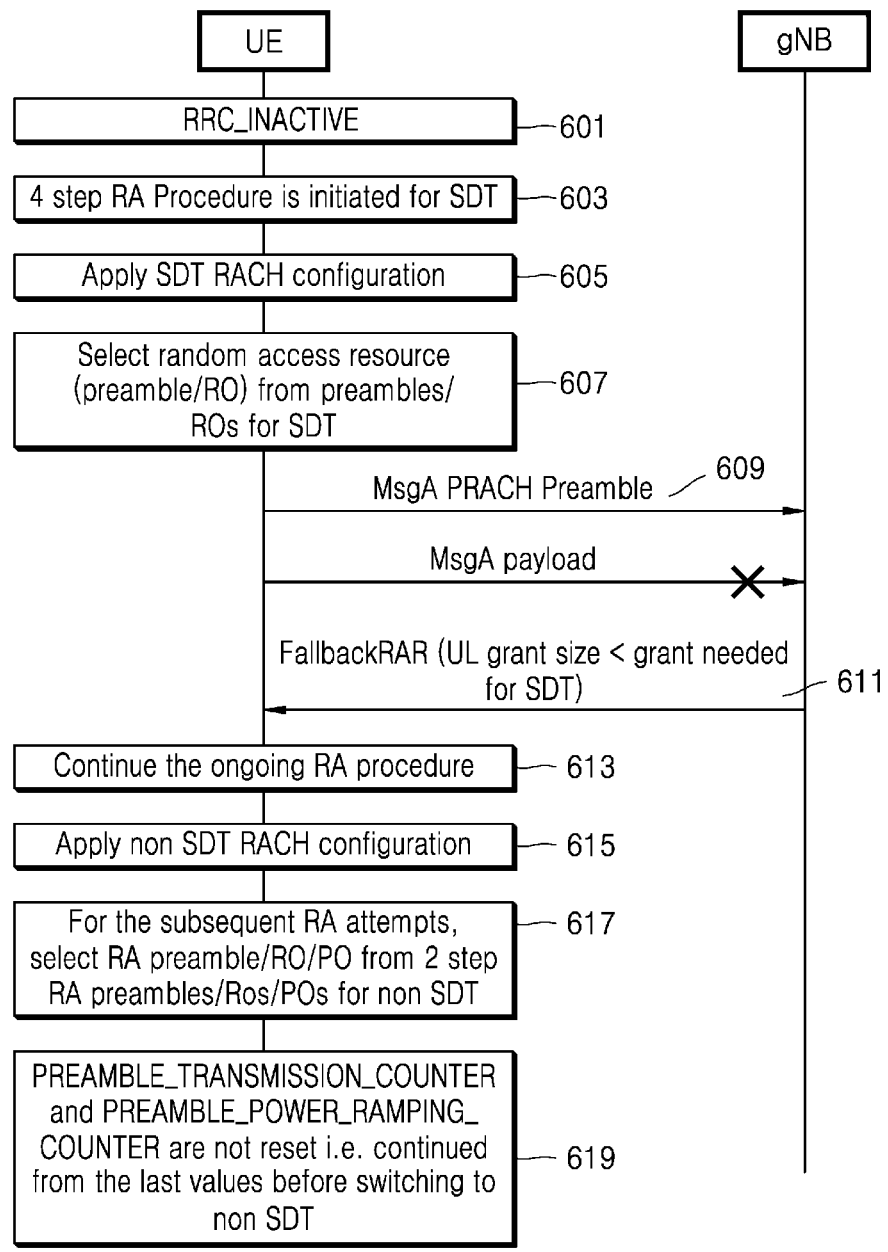
FIG. 6 is a flowchart illustrating a method for switching to random access for non-small data transmission according to an embodiment of the disclosure.

Method 2:

FIG. 6 is a flowchart illustrating a method for switching to random access for non-small data transmission according to an embodiment of the disclosure.

Figure 7:
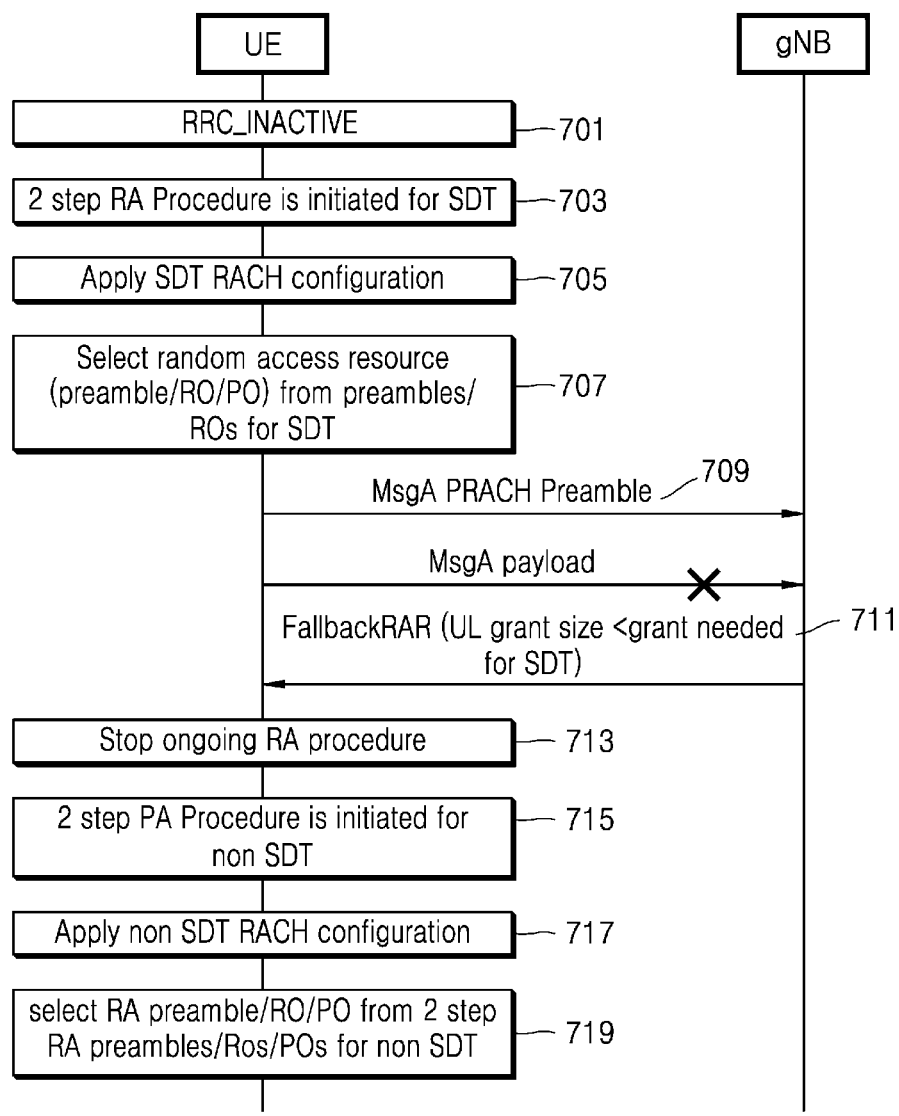
FIG. 7 is a flowchart illustrating a method for switching to random access for non-small data transmission according to an embodiment of the disclosure.

FIG. 7 is a flowchart illustrating a method for switching to random access for non-small data transmission according to an embodiment of the disclosure.

UE is in RRC_CONNECTED. In the RRC_CONNECTED, UE receives RRCRelease with suspend configuration.

Referring to FIG. 6, in operation 601, the UE may enter RRC_INACTIVE.

During the RRC_INACTIVE, the UE may initiate RRC connection resumption for the small data transmission when criteria (e.g. RSRP is above a threshold and available data volume for transmission is smaller than a threshold) to perform the small data transmission is met. In operation 603, the UE may initiate 2 step RA procedure for the small data transmission. Upon initiation of RA procedure, the UE may select the UL carrier, BWP on selected UL carrier and RA type (2 step or 4 step) as explained earlier in this disclosure.

In operation 605, the UE may apply SDT_RACH configuration. UE initializes PREAMBLE_TRANSMISSION_COUNTER to 1. PREAMBLE_POWER_RAMPING_COUNTER to 1.

In operation 607, the UE may select random access resource. For example, the UE may identify an SSB from SSBs transmitted in camped cell. The identified SSB is the one whose SS-RSRP is above a threshold or any SSB can be used if there is no SSB whose SS-RSRP is above a threshold. The UE may identify a preamble corresponding to identified SSB from the preambles for the SDT. The UE may identify RACH occasion (RO) corresponding to identified SSB from ROs for the SDT. The UE may identify PUSCH occasion (PO) corresponding to the identified preamble and RO.

In operation 609, the UE may transmit, to the gNB, RA preamble and MsgA MAC PDU using RACH resources/preambles/POs configured for SDT. The preamble transmission power is determined based on PREAMBLE_POWER_RAMPING_COUNTER and PREAMBLE_TRANSMISSION_COUNTER. The UE then monitors the PDCCH addressed to MSGB-RNTI for MsgB within a response window.

In an embodiment, the MsgA payload transmitted from the UE to the gNB is not received by the GNB.

In operation 611, the UE may receive, from the gNB, UL grant in fallbackRAR (fallbackRAR MAC subPDU is received in DL TB (DL TB includes MsgB MAC PDU, MsgB MAC PDU includes fallbackRAR MAC subPDU) scheduled by PDCCH addressed to MSGB-RNTI) corresponding to RA preamble transmitted by UE. FallbackRAR corresponds to RA preamble transmitted by UE, if RAPID field in MAC subheader of fallbackRAR MAC subPDU incudes random access preamble index of RA preamble transmitted by UE. Note that if MsgB is not received and response window expires, the UE may increment PREAMBLE_TRANSMISSION_COUNTER and perform operation 607 and 609. The UE may also increment PREAMBLE_POWER_RAMPING_COUNTER if SSB selected at operation 607 is not changed from the SSB identified in last preamble transmission.

The UE may identify whether the size of the UL grant is less than the MAC PDU size determined at the time of selecting SDT. In an embodiment, the UE may identify whether a bit in fallbackRAR payload in fallbackRAR MAC subPDU of received MsgB is set to 1 to indicate that UL grant is not for the small data transmission or a bit in MAC subheader of the fallbackRAR MAC subPDU of the received MsgB is set to 1 to indicate that UL grant is not for the small data transmission. In a case where the size of the UL grant is less than the MAC PDU size, the UE may perform operations as follows.

The UE may cancel the SDT and proceed with normal connection resume (i.e. uplink data is not transmitted in Msg3 MAC PDU and only resume message is transmitted). Note that MsgA MAC PDU is transmitted as Msg3. As part of cancellation of SDT procedure, the UE may suspend the SRB 2 and DRBs, if they were resumed when SDT procedure was initiated. The UE may also stop the timer started upon initiation of SDT procedure and start the timer for connection resume procedure i.e. T319.

Msg3 MAC PDU if already generated is rebuilt (UL data is deprioritized i.e. removed from MAC PDU) and transmitted in received the UL grant. UE may start a contention resolution timer. If the contention resolution timer expires, one of the following can be performed:

Option 1 (FIG. 6):

In operation 613, the UE may continue the ongoing RA procedure.

In operation 615, the UE may apply Non SDT RACH configuration.

In operation 617, however, for the subsequent RA attempt, the UE may select RA preamble/RO/PO from 2 step RA preambles/ROs/POs for non SDT.

In operation 619, a parameter PREAMBLE_TRANSMISSION_COUNTER and a parameter PREAMBLE_POWER_RAMPING_COUNTER are not reset. For example, the parameter PREAMBLE_TRANSMISSION_COUNTER and the parameter PREAMBLE_POWER_RAMPING_COUNTER may be continued from the last values before switching to non SDT.

Option 2 (FIG. 7):

Referring to FIG. 7, operations 601 to 611 in FIG. 6 correspond to operations 701 to 711 in FIG. 7.

In operation 713, the UE may stop the ongoing RA procedure.

In operation 715, the UE may initiate the new RA procedure using Non SDT RACH configuration.

In operation 717, the UE may apply the non SDT RACH configuration.

In operation 719, the UE may select RA preamble/RO/PO from 2 step RA preambles/ROs/POs for non SDT.

The content of MsgA/Msg3 MAC PDU which is already built during the ongoing RA procedure can be used to generate MsgA MAC PDU for new RA procedure. Alternatively, RRC can generate the resume message again which is transmitted in MsgA.

Figure 8:
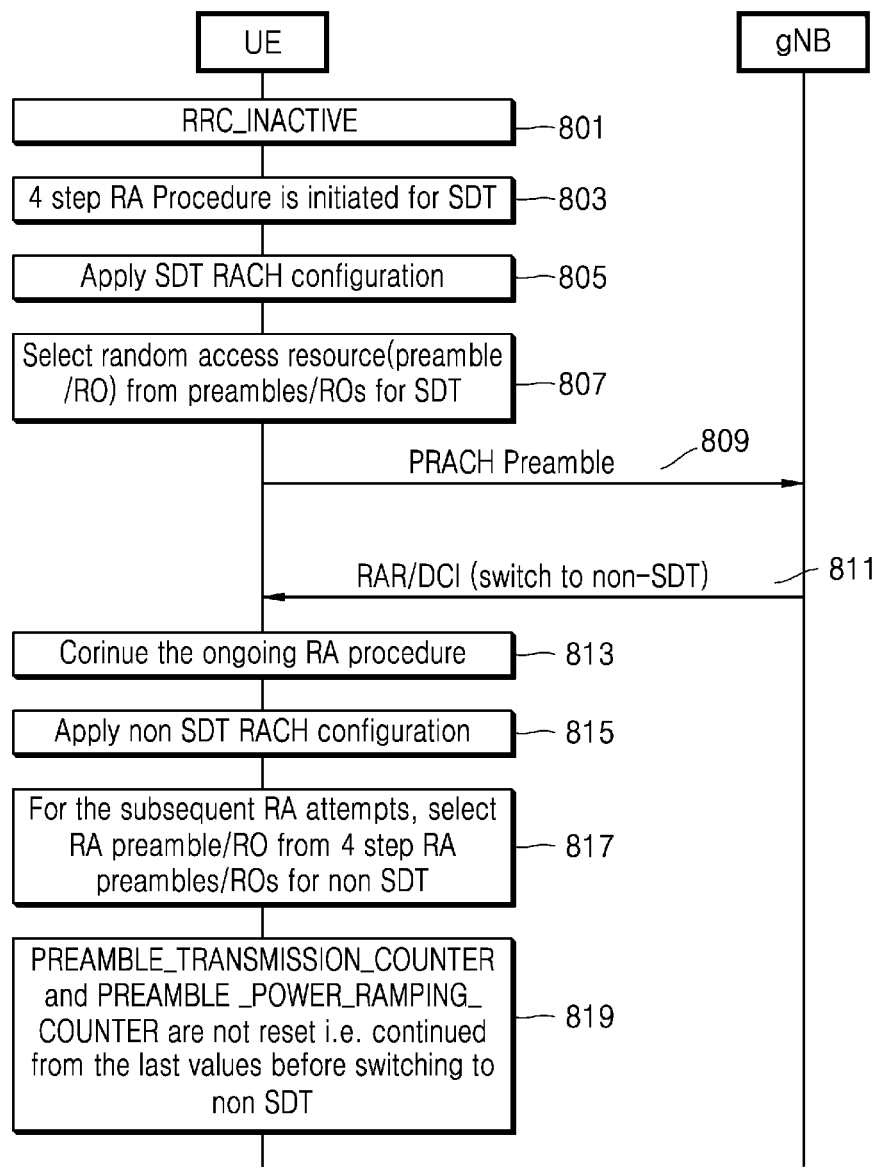
FIG. 8 is a flowchart illustrating a method for switching to random access for non-small data transmission according to an embodiment of the disclosure.

Method 3:

FIG. 8 is a flowchart illustrating a method for switching to random access for non-small data transmission according to an embodiment of the disclosure.

Figure 9:
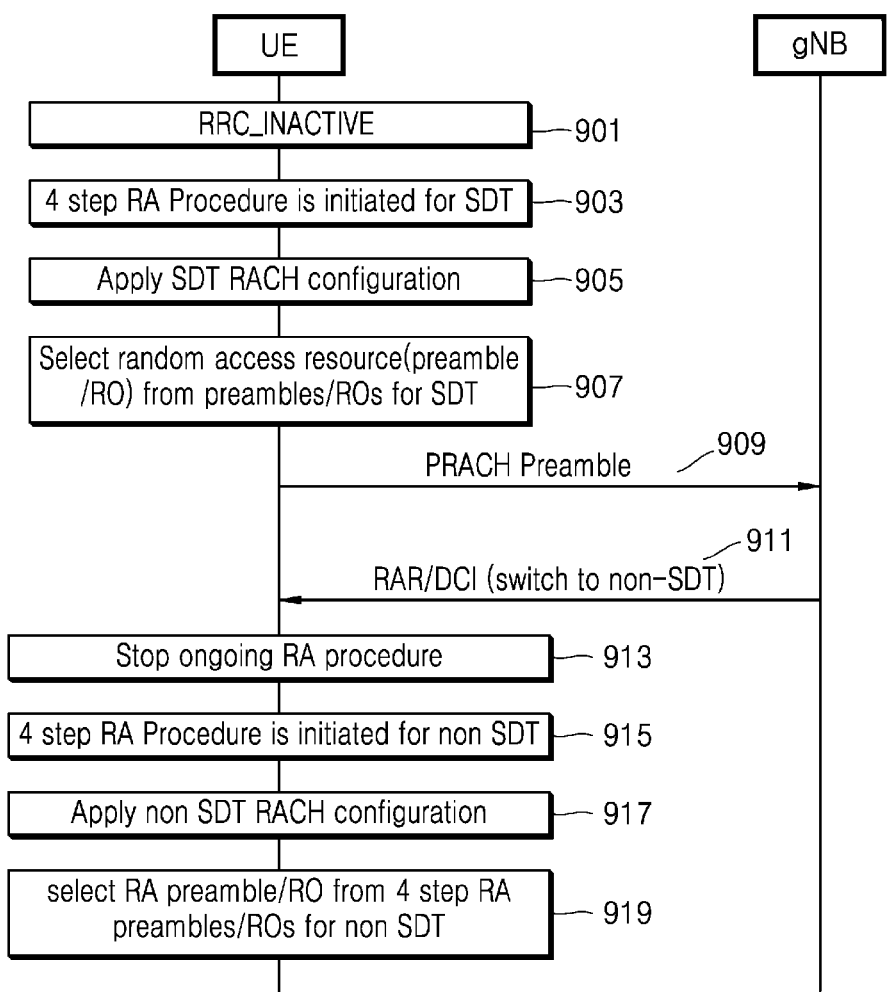
FIG. 9 is a flowchart illustrating a method for switching to random access for non-small data transmission according to an embodiment of the disclosure.

FIG. 9 is a flowchart illustrating a method for switching to random access for non-small data transmission according to an embodiment of the disclosure.

The UE is in RRC_CONNECTED. In the RRC_CONNECTED, UE receives RRCRelease with suspend configuration.

Referring to FIG. 8, upon receiving RRCRelease with suspend configuration the UE may enter RRC_INACTIVE.

During the RRC_INACTIVE, the UE may initiate RRC connection resumption for small data transmission when criteria to perform the small data transmission is met. In operation 803, the UE may initiate 4 step RA procedure for the small data transmission. Upon initiation of RA procedure, the UE may select the UL carrier, BWP on selected UL carrier and RA type (2 step or 4 step) as explained earlier in this disclosure. In operation 805, the UE may apply SDT RACH configuration. The UE may initialize PREAMBLE_TRANSMISSION_COUNTER to 1 and PREAMBLE_POWER_RAMPING_COUNTER to 1.

In operation 807, the UE may select random access resource. For example, the UE may identify an SSB from SSBs transmitted in camped cell. The identified SSB is the one whose SS-RSRP is above a threshold or any SSB can be used if there is no SSB whose SS-RSRP is above a threshold. The UE may identify a preamble corresponding to identified SSB from the preambles for the SDT. The UE may identify RACH occasion (RO) corresponding to identified SSB from ROs for the SDT.

In operation 809, the UE transmit, to the gNB, RA preamble using RACH resources/preambles configured for SDT. The preamble transmission power is determined based on PREAMBLE_POWER_RAMPING_COUNTER and PREAMBLE_TRANSMISSION_COUNTER. The UE may monitor PDCCH addressed to RA-RNTI in RAR window for receiving RAR.

In operation 811, the gNB may indicate the UE to switch to non-SDT.

In an embodiment, DCI may include an indication to switch to non-SDT (DCI is in PDCCH addressed to RA-RNTI).

In an embodiment, the RAR may include an indication to switch to non-SDT. For example, reserved BI value can be used to indicate UEs performing SDT to switch to RACH for non SDT. Or a bit in payload of RAR MAC subPDU in RAR MAC PDU can indicate UEs performing SDT to switch to RACH for non SDT or a bit in MAC subheader of RAR MAC subPDU in RAR MAC PDU can indicate UEs performing SDT to switch to RACH for non SDT UE operation upon receiving indication to switch to non SDT in accordance with an embodiment of the disclosure is as follows.

The UE may cancel SDT procedure (or connection resume procedure initiated for SDT) and proceed with normal connection resume (i.e. uplink data is not transmitted in Msg3 MAC PDU and only resume message is transmitted).

Option 1 (FIG. 8):

In operation 813, the UE may continue the ongoing RA procedure.

In operation 815, Non SDT RACH configuration may be applied.

In operation 817, however, for the subsequent RA attempt, the UE may select RA preamble/RO from 4 step RA preambles/ROs for non SDT.

In operation 819, a parameter PREAMBLE_TRANSMISSION_COUNTER and a parameter PREAMBLE_POWER_RAMPING_COUNTER are not reset. For example, the parameter PREAMBLE_TRANSMISSION_COUNTER and the parameter PREAMBLE_POWER_RAMPING_COUNTER may be continued from the last values before switching to non SDT.

Option 2 (FIG. 9):

Referring to FIG. 9, operations 801 to 811 in FIG. 8 correspond to operations 901 to 911 in FIG. 9.

In operation 913, the UE may stop the ongoing RA procedure.

In operation 915, the UE may initiate the new RA procedure using Non SDT RACH configuration. For example, the UE may initiate 4 step RA procedure for non SDT.

In operation 917, the UE may apply non SDT RACH configuration.

In operation 919, the UE may select RA preamble/RO from 4 step RA preambles/ROs for non SDT.

The content of Msg3 MAC PDU which is already built during the ongoing RA procedure can be used to generate Msg3 MAC PDU for new RA procedure. Alternatively, RRC can generate the resume message again which is transmitted in MsgA.

Method 4:

The UE is in RRC_CONNECTED. In the RRC_CONNECTED, The UE may receive RRCRelease with suspend configuration.

Upon receiving the RRCRelease with suspend configuration, the UE may enter RRC_INACTIVE. and perform the following operations: The UE may reset MAC and release the default MAC Cell Group configuration, if any. The UE may re-establish RLC entities for SRB1. The UE may store in the UE Inactive AS Context the current KgNB and KRRCint keys, the ROHC state, the stored QoS flow to DRB mapping rules, the C-RNTI used in the source PCell, the cellIdentity and the physical cell identity of the source PCell, and all other parameters configured except for the ones within ReconfigurationWithSync and servingCellConfigCommonSIB received in RRCReconfiguration message while the UE was in RRC_CONNECTED state. The UE may also store next hopping chain count (NCC) and other parameters received in RRCRelease message. The UE may suspend all SRB(s) and DRB(s), except SRB0.

During the RRC_INACTIVE, the UE may initiate RRC connection resumption for the small data transmission (or initiates small data transmission procedure) when criteria (e.g. RSRP is above a threshold and available data volume for transmission is smaller than a threshold) to perform the small data transmission is met. Upon initiation of RA procedure UE may select the UL carrier, BWP on selected UL carrier and RA type (2 step or 4 step) as explained earlier in this disclosure. The UE may initiate 2 step RA procedure for small data transmission. The UE may initialize PREAMBLE_TRANSMISSION_COUNTER to 1 and PREAMBLE_POWER_RAMPING_COUNTER to 1.

The UE may select random access resource. For example, the UE may identify an SSB from SSBs transmitted in camped cell. The identified SSB is the one whose SS-RSRP is above a threshold or any SSB can be used if there is no SSB whose SS-RSRP is above a threshold. The UE may identify a preamble corresponding to identified SSB from the preambles for the SDT. The UE may identify RACH occasion (RO) corresponding to identified SSB from ROs for the SDT. The UE may identify PUSCH occasion (PO) corresponding to the identified preamble and RO.

The UE may transmit, to the gNB, RA preamble and MsgA MAC PDU using RACH resources/preambles/POs configured for SDT. The preamble transmission power is determined based on PREAMBLE_POWER_RAMPING_COUNTER and PREAMBLE_TRANSMISSION_COUNTER. The UE may monitor PDCCH addressed to MsgB-RNTI in response window for receiving MsgB.

The gNB may indicate the UE to switch to non-SDT. Alternately, the gNB may send RRCResume message to UE in MsgB to enter RRC CONNECTED; in this case, the UE may perform resume procedure and enter RRC connected and SDT is not performed after receiving the resume.

In an embodiment, DCI may include an indication to switch to non-SDT (DCI is in PDCCH addressed to MSGB-RNTI or a pre-defined RNTI).

In an embodiment, the MsgB may include an indication to switch to non-SDT. Example, reserved BI value can be used to indicate UEs performing SDT to switch to RACH for non SDT. Or a bit in payload of MsgB MAC subPDU in MsgB MAC PDU can indicate UEs performing SDT to switch to RACH for non SDT or a bit in header of MsgB MAC subPDU in RAR MAC PDU can indicate UEs performing SDT to switch to RACH for non SDT.

UE operation upon receiving indication to switch to non SDT in accordance with an embodiment of the disclosure is as follows.

The UE may cancel SDT and proceed with normal connection resume (i.e. uplink data is not transmitted in Msg3 MAC PDU and only resume message is transmitted). As part of cancellation of SDT procedure, the UE may suspend the SRB 2 and DRBs, if they were resumed when SDT procedure was initiated. The UE may also stop the timer started upon initiation of SDT procedure and start the timer for connection resume procedure i.e. T319.

Option 1: The UE may continue the ongoing RA procedure. However, for the subsequent RA attempt, the UE may select RA preamble/RO/PO from 2 step RA preambles/ROs/POs for non SDT. Non SDT RACH configuration is applied. A parameter PREAMBLE_TRANSMISSION_COUNTER and a parameter PREAMBLE_POWER_RAMPING_COUNTER are not reset.

Option 2: The UE may stop the ongoing RA procedure. The UE may initiate the new RA procedure using Non SDT RACH configuration. The content of MsgA/Msg3 MAC PDU which is already built during the ongoing RA procedure can be used to generate MsgA MAC PDU for new RA procedure. Alternatively, RRC can generate the resume message again which is transmitted in MsgA.

Modification to RA type/carrier selection for SDT

In accordance with an embodiment of the disclosure, operation for RA type/carrier selection for random access procedure initiated for SDT is performed as follows.

1> if serving cell is configured with SUL and if the RSRP of the downlink pathloss reference is less than rsrp-ThresholdSSB-SUL:
2> the UE may select the SUL carrier for performing Random Access procedure;
1> else:
2> the UE may select the NUL carrier for performing Random Access procedure;

In accordance with another embodiment of the disclosure, enhanced Procedure for the RA type/carrier selection for the SDT is as follows.

1> if serving cell is configured with SUL and if the RSRP of the downlink pathloss reference is less than rsrp-ThresholdSSB-SUL:
2> the UE may select the SUL carrier for performing Random Access procedure;
1> else:
2> if random access procedure is initiated for small data transmission; and
2> If the message size (UL data available for transmission plus MAC header and, where required, MAC control elements) is less than or equal to TB size signaled in sdt-TBS-SUL and greater than TB size signaled in sdt-TBS-NUL:
3> the UE may select the SUL carrier for performing Random Access procedure
2> Else:
3> the UE may select the NUL carrier for performing Random Access procedure;

sdt-TBS for 2 step and 4 step can be different. If different, following enhancement can also be applied for RA type selection.

If RSRP of the downlink pathloss reference is above RSRP_THRESHOLD_RA_TYPE_SELECTION:
  If criteria (sdt-TBS size, sdt-threshold etc.) to perform SDT using 2 step RA is met
  2 step RA
  Else if criteria (sdt-TBS size, sdt-threshold etc.) to perform SDT using 4 step RA is met
  4 step RA
  Else: no SDT
Else:
  if criteria to perform SDT using 4 step RA is met
  4 step RA
  Else: no SDT Handling overlapping between ROs for SDT and other ROs This is for the case ROs for SDT are separately configured. ROs for SDT an overlap with ROs for non SDT. In this case ROs as per RACH configuration for SDT which overlaps with ROs as RACH configuration for regular (i.e. RACH procedure for non SDT purpose), are considered as invalid. The UE does not use them for SDT.

Enhanced 2 step RA procedure for small data transmission.

For 2 step RA, simplest approach would be to simply transmit uplink data together with RRCResumeRequest/RRCResumeRequest1 in MsgA instead of Msg3 (as shown in FIG. 2). However, this approach leads to significant PUSCH resource overhead for MsgA MAC PDU transmission. In order to support flexible payload sizes, several PUSCH resource pools need to be configured. Each of these resource pools are contention based, so enough resources need to be configured in each pool to reduce collision probability. After each PUSCH resource are configured, enough guard time should be there since TA is not applied to MsgA PUSCH transmission. Therefore, simply transmitting uplink data in the MsgA may result in lots of guard time which is waste of resources.

Figure 10:
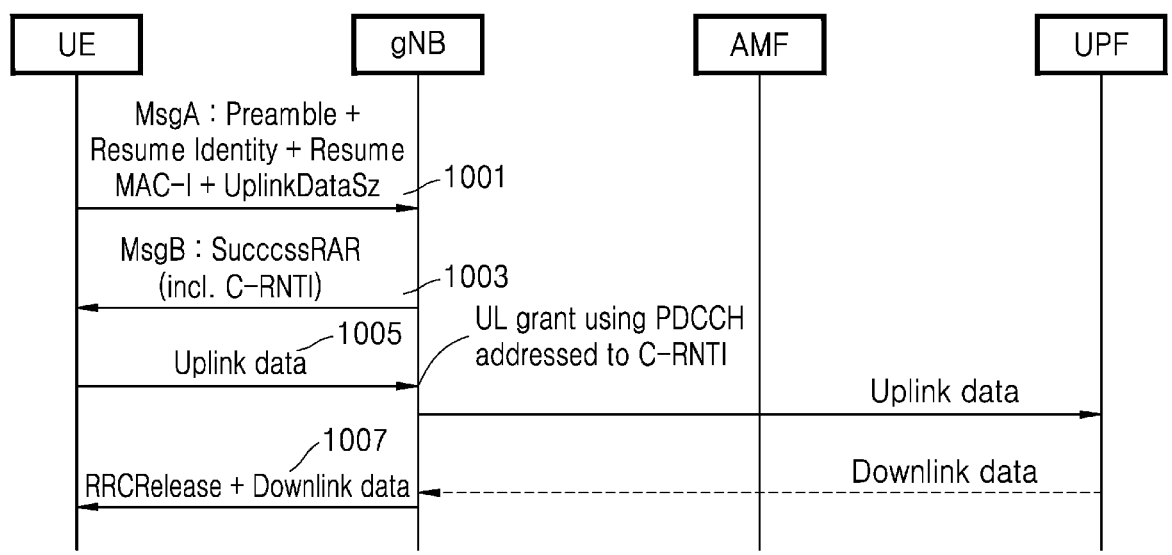
FIG. 10 is a flowchart illustrating an enhanced RA procedure for small data transmission according to an embodiment of the disclosure.

FIG. 10 is a flowchart illustrating an enhanced 2 step RA procedure for small data transmission according to an embodiment of the disclosure.

Referring to FIG. 10, in this procedure, upon initiating the 2 step RA procedure for SDT, the UE may transmit MsgA i.e. random access preamble and MsgA MAC PDU. MsgA MAC PDU includes Resume Identity (full/short I-RNTI, whether to transmit full or short I-RNTI is indicated by the gNB in system information or RRCRelease message), ResumeMAC-I, Uplink data size (e.g. MAC PDU size including MAC SDU(s) from DTCHs). Uplink data (i.e. MAC SDU from RBs configured for SDT) is not transmitted in MsgA. Uplink data is transmitted after receiving MsgB. The UL grant for Uplink data can be provided in MsgB or alternatively, the UL grant can be provided by PDCCH addressed to C-RNTI after the MsgB, where the C-RNTI is included in MsgB. Note that in an embodiment, UL data size may not be included in MsgA and the UE can select preamble from one of the preamble groups, wherein each preamble group corresponds to different MAC PDU size.

How to transmit {Resume Identity, ResumeMAC-I, Uplink data size} in MsgA payload.
  Option 1: New RRC messages are defined: RRCResumeRequestSDT/RRCResumeRequestSDT1.
  RRCResumeRequestSDT/RRCResumeRequestSDT1 includes Resume Identity, ResumeMAC-I, Uplink data size. No resume cause.
  Option 2: RRCResumeRequest/RRCResumeRequest1 are used with modification
  Spare bit indicates that resume is for small data transmission
  Resume cause code points indicate Uplink data size
  Option 3: RRCResumeRequest/RRCResumeRequest1 includes Resume Identity, ResumeMAC-I, Resume cause
  Uplink data size is included in a new MAC CE (e.g. BSR MAC CE)

FIG. 10 shows the signaling flow for small data transmission using 2 step RA.

The UE is in RRC_INACTIVE state. Criteria to initiate 2 step RA for SDT is met. UE select preamble/RO/PO from preambles/ROs/POs for 2 step RA. Note that preambles/ROs/POs for SDT and non SDT can be same. In operation 1001, the UE may transmit, to the gNB, random access preamble.

Referring to FIG. 10, in operation 1001, in the MsgA payload, the UE may transmit full/short I-RNTI (resume-Identity), ResumeMAC-I, Uplink data size included in RRC message/MAC CE as explained above to the gNB (same as the last serving GNB) on SRB 0. The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the KRRCint from the stored AS security context with the following inputs:

KEY: it shall be set to current KRRCint;
BEARER: all its bits shall be set to 1.
DIRECTION: its bit shall be set to 1;

COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE may resume SRB(s) and DRB(s), derive new security keys using the NextHopChainingCount provided in the RRCRelease message of the previous RRC connection and re-establish the AS security. The user data are ciphered and integrity protected (Only for DRBs configured with UP integrity protection).

The gNB may validate the resumeMAC-I. Upon validation, in operation 1003, the gNB may transmit, to the UE, MsgB with successRAR (C-RNTI, contention resolution identity, TA, PDSCH-to-HARQ feedback timing indicator for MsgB HARQ feedback, TPC command for the PUCCH resource containing HARQ feedback for MsgB, and PUCCH resource indicator for HARQ feedback for MsgB). PDCCH scheduling DL TB for MsgB is addressed to MsgB-RNTI. The gNB may include UL grant in MsgB or after MsgB, the gNB may transmit, to the terminal, a PDCCH addressed to C-RNTI scheduling UL grant for uplink data transmission. Note that GNB can identify the amount of UL grant needed based on UL data size information received from UE in MsgA.

Upon receiving MsgB with success RAR including contention resolution identity which matches the CCCH SDU transmitted in MsgA, RA procedure is considered completed. The UE may continue in RRC_INACTIVE state. UE monitors PDCCH addressed to C-RNTI received in successRAR.

In operation 1005, the UE may transmit, to the gNB, uplink data in received UL grant. Uplink grant is forwarded by the gNB to the UPF.

In operation 1007, the gNB may transmit the RRCRelease message to keep the UE in RRC_INACTIVE. The PDCCH scheduling DL TB carrying RRCRelease message is addressed to C-RNTI. If downlink data is available, they are sent ciphered and protected with integrity (Only for DRBs configured with UP integrity protection) on DTCH multiplexed with the RRCRelease message on DCCH. It is also possible to first send downlink data to UE and then RRCRelease message but this will increase latency and PDCCH overhead.

Figure 11:
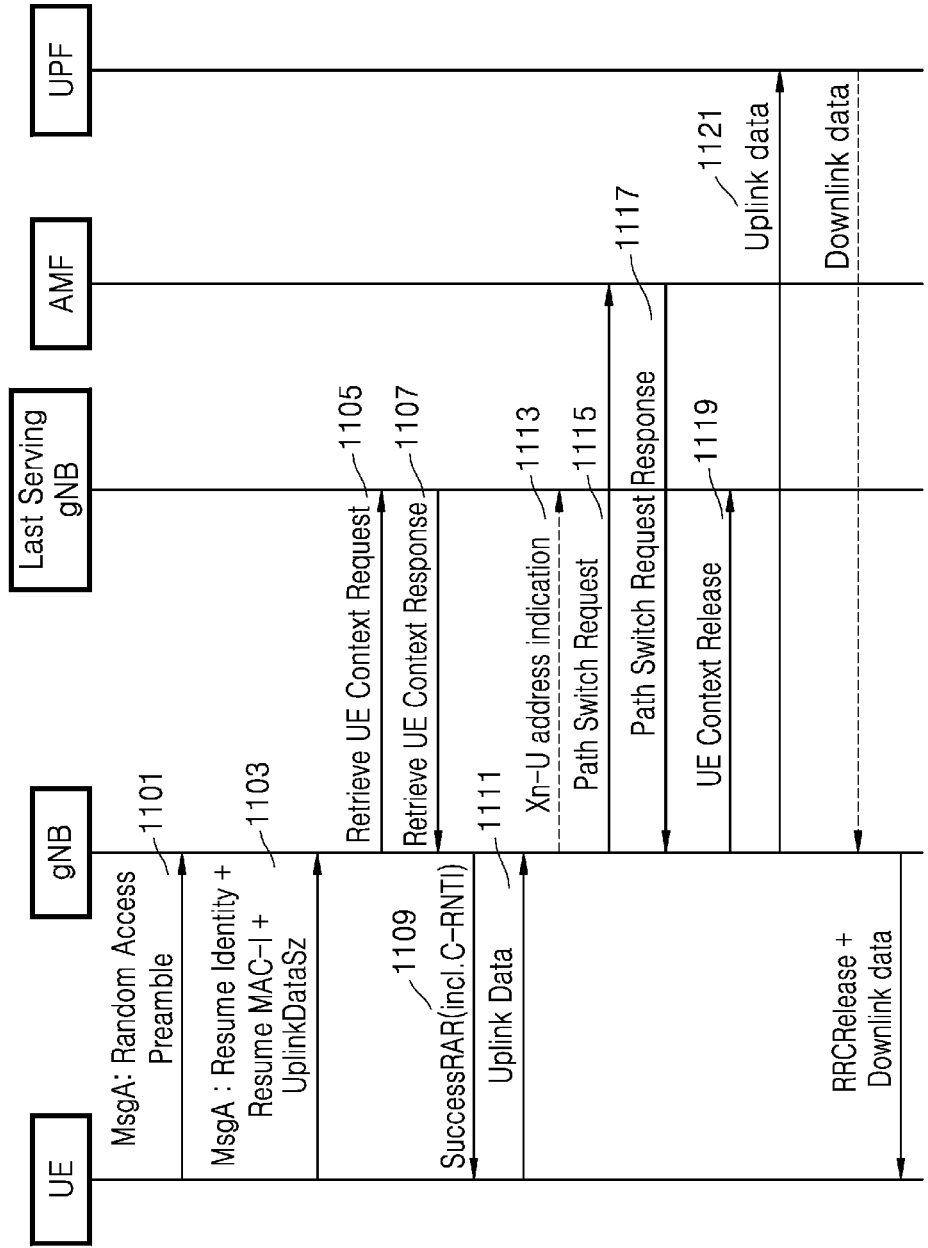
FIG. 11 is a flowchart illustrating small data transmission using 2 step RA according to an embodiment of the disclosure.

FIG. 11 is a flowchart illustrating small data transmission using 2 step RA. In this case, it is assumed the gNB does not have the UE's context and fetches the same from last serving gNB. Path switch is performed and context is released from last serving gNB according to an embodiment of the disclosure.

Referring to FIG. 11, the UE is in RRC INACTIVE state. Criteria to initiate 2 step RA for SDT is met. UE may select preamble/RO/PO from preambles/ROs/POs for 2 step RA. Note that preambles/ROs/POs for SDT and non SDT can be same. In operation 1101, the UE may transmit, to the gNB, random access preamble.

In the MsgA payload, the UE may transmit full/short I-RNTI (resumeIdentity), ResumeMAC-I, Uplink data size included in RRC message/MAC CE as explained above to the gNB (same as the last serving GNB) on SRB 0 in operation 110. The I-RNTI (short or full I-RNTI) is used for context identification and its value shall be the same as the I-RNTI that the UE had received from the last serving gNB in the RRCRelease with suspendConfig message. The ResumeMAC-I is a 16-bit message authentication token, the UE shall calculate it using the integrity algorithm (NIA or EIA) in the stored AS security context, which was negotiated between the UE and the last serving gNB and the KRRCint from the stored AS security context with the following inputs:
KEY: it shall be set to current KRRCint;
BEARER: all its bits shall be set to 1.
DIRECTION: its bit shall be set to 1;
COUNT: all its bits shall be set to 1;
MESSAGE: it shall be set to VarResumeMAC-Input with following inputs:
source PCI (set to the physical cell identity of the PCell the UE was connected to prior to suspension of the RRC connection)
target Cell-ID (Set to the cellIdentity of the first PLMN-Identity included in the PLMN-IdentityInfoList broadcasted in SIB1 of the target cell i.e. the cell to which the UE is sending small data)
source C-RNTI (Set to C-RNTI that the UE had in the PCell it was connected to prior to suspension of the RRC connection).

The UE may resume SRB(s) and DRB(s), derive new security keys using the NextHopChainingCount provided in the RRCRelease message of the previous RRC connection and re-establish the AS security. The user data are ciphered and protected with integrity (Only for DRBs configured with UP integrity protection).

In operation 1105, the gNB (i.e. target GNB) may identify the GNB identity of last serving gNB (i.e., source gNB) from I-RNTI and request the last serving gNB to provide the UE's context data by sending an Retrieve UE Context Request message with the following included: I-RNTI, the ResumeMAC-I and target Cell-ID, in order to allow the source gNB to validate the UE request and to retrieve the UE context.

In operation 1107, the last serving gNB (i.e. a source gNB) may validate the resumeMAC-I and provide the UE context data. The source gNB may retrieve the stored UE context including the UE 5G AS security context from its database using the I-RNTI. The source gNB may verify the ResumeMAC-I using the current KRRCint key stored in the retrieved UE 5G AS security context (calculating the ResumeMAC-I in the same way as described above).

If the verification of the ResumeMAC-I is successful, then the source gNB may calculate KNG-RAN* using the target cell PCI, target ARFCN-DL and the KgNB/NH in the current UE 5G AS security context based on either a horizontal key derivation or a vertical key derivation according to whether the source gNB has an unused pair of {NCC, NH}. The source gNB can obtain the target PCI and target ARFCN-DL from a cell configuration database by means of the target Cell-ID which was received from the target gNB. Then the source gNB shall respond with an Xn-AP Retrieve UE Context Response message to the target gNB including the UE context that contains the UE 5G AS security context. The UE 5G AS security context sent to the target gNB shall include the newly derived KNG-RAN*, the NCC associated to the KNG-RAN*, the UE 5G security capabilities, UP security policy, the UP security activation status with the corresponding PDU session ID(s), and the ciphering and integrity algorithms used by the UE with the source cell.

Upon recovering context from last serving gNB, in operation 1109, the gNB may transmit, to the UE, MsgB with successRAR (C-RNTI, contention resolution identity, TA, PDSCH-to-HARQ feedback timing indicator for MsgB HARQ feedback, TPC command for the PUCCH resource containing HARQ feedback for MsgB, and PUCCH resource indicator for HARQ feedback for MsgB). PDCCH scheduling DL TB for MsgB is addressed to MsgB-RNTI. The gNB may include UL grant in MsgB or after MsgB gNB sends a PDCCH addressed to C-RNTI scheduling UL grant for uplink data transmission Note that GNB can identify the amount of UL grant needed based on UL data size information received from UE in MsgA.

Upon receiving MsgB with success RAR including contention resolution identity which matches the CCCH SDU transmitted in MsgA, RA procedure is considered completed. The UE may continue in RRC INACTIVE state. UE monitor PDCCH addressed to C-RNTI received in successRAR.

The UE transmit Uplink data in received UL grant to gNB in operation 1111.

In operation 1113, if loss of DL user data buffered in the last serving gNB shall be prevented, the gNB provides forwarding addresses.

in operation 1115, the gNB may perform path switch.

In operation 1117, the gNB may receive, from AMF, path switch request response.

In operation 1119, the gNB may trigger the release of the UE resources at the last serving gNB.

In operation 1121, the gNB may deliver the uplink data to UPF.

The operation 1115 to 1121 can also be performed after operation 1107.

Figure 12:
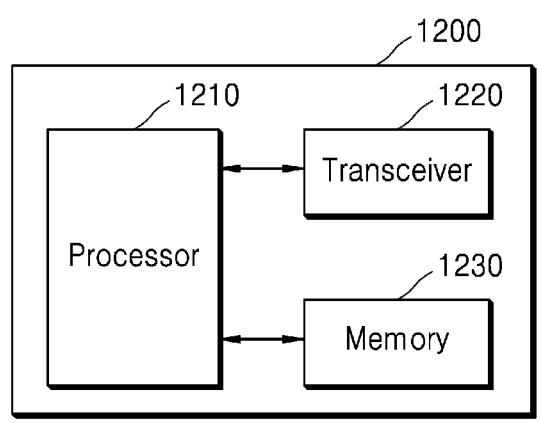
FIG. 12 is a diagram illustrating a UE according to an embodiment of the disclosure.

FIG. 12 is a diagram illustrating a UE according to an embodiment of the disclosure.

Referring to the FIG. 12, a UE 1200 may include a processor 1210, a transceiver 1220 and a memory 1230. However, all of the illustrated components are not essential. The UE 1200 may be implemented by more or less components than those illustrated in the FIG. 12. In addition, the processor 1210 and the transceiver 1220 and the memory 1230 may be implemented as a single chip according to another embodiment.

The aforementioned components will now be described in detail.

The processor 1210 may include one or more processors or other processing devices that control the proposed function, process, and/or method. Operation of the UE 1200 may be implemented by the processor 1210.

In accordance with an embodiment of the disclosure, in case that a random access procedure for small data transmission (SDT) in a radio resource control (RRC) inactive state is initiated, the processor 1210 may transmit, to a base station via the transceiver 1220, a RRC message including a parameter associated with a size of uplink data. The processor 1210 may receive, from the base station via the transceiver 1220, a response message including information associated with a transmission resource for the uplink data and may transmit, to the base station via the transceiver 1220, the uplink data based on the transmission resource.

In accordance with another embodiment of the disclosure, in case that a random access procedure for small data transmission (SDT) in a radio resource control (RRC) inactive state is initiated, the processor 1210 may transmit, to a base station via the transceiver 1220, a random access preamble. The processor 1210 may receive, from the base station via the transceiver 1220, information indicating that the terminal is to perform non-SDT. The processor 1210 may, based on the information, identify whether to end the ongoing random access procedure for the SDT and perform the non-SDT based on the identification.

The transceiver 1220 may be connected to the processor 1210 and transmit and/or receive a signal. In addition, the transceiver 1220 may receive the signal through a wireless channel and output the signal to the processor 1210. The transceiver 1220 may transmit the signal output from the processor 1210 through the wireless channel.

The memory 1230 may store the control information or the data included in a signal obtained by the UE 1200. The memory 1230 may be connected to the processor 1210 and store at least one instruction or a protocol or a parameter for the proposed function, process, and/or method. The memory 1230 may include read-only memory (ROM) and/or random access memory (RAM) and/or hard disk and/or compact disc read only memory (CD-ROM) and/or digital versatile disc (DVD) and/or other storage devices.

Figure 13:
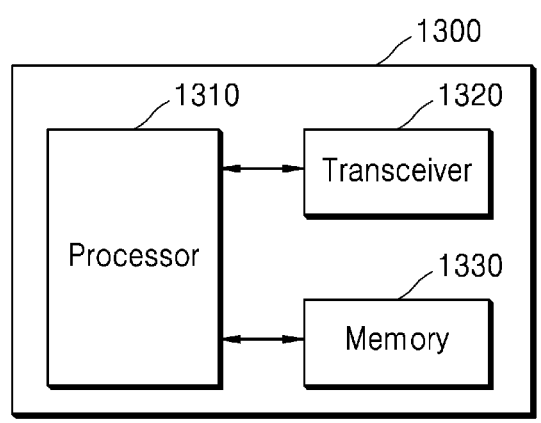
FIG. 13 is a diagram illustrating a base station according to an embodiment of the disclosure.

FIG. 13 is a diagram illustrating a base station according to an embodiment of the disclosure.

Referring to the FIG. 13, a base station 1300 may include a processor 1310, a transceiver 1320 and a memory 1330. However, all of the illustrated components are not essential. The base station 1300 may be implemented by more or less components than those illustrated in FIG. 13. In addition, the processor 1310 and the transceiver 1320 and the memory 1330 may be implemented as a single chip according to another embodiment.

The aforementioned components will now be described in detail.

The processor 1310 may include one or more processors or other processing devices that control the proposed function, process, and/or method. Operation of the base station 1300 may be implemented by the processor 1310.

The transceiver 1320 may be connected to the processor 1310 and transmit and/or receive a signal. The signal may include control information and data. In addition, the transceiver 1320 may receive the signal through a wireless channel and output the signal to the processor 1310. The transceiver 1320 may transmit a signal output from the processor 1310 through the wireless channel.

The memory 1330 may store the control information or the data included in a signal obtained by the base station 1300. The memory 1330 may be connected to the processor 1310 and store at least one instruction or a protocol or a parameter for the proposed function, process, and/or method. The memory 1330 may include read-only memory (ROM) and/or random access memory (RAM) and/or hard disk and/or CD-ROM and/or DVD and/or other storage devices.

Figure 14:
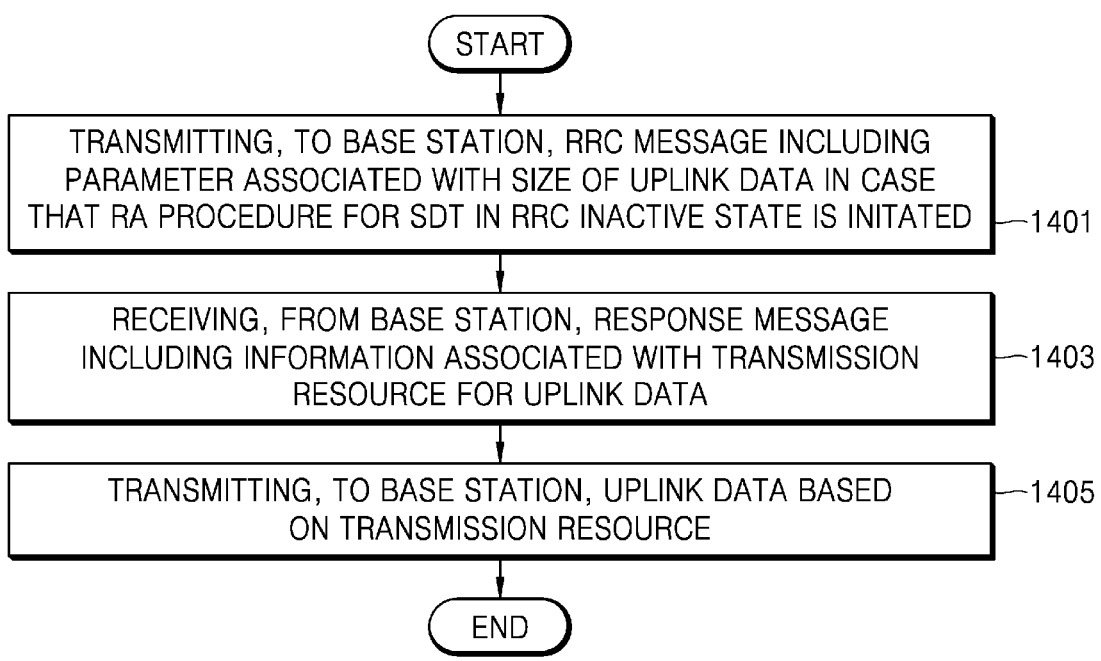
FIG. 14 is a flowchart illustrating a method performed by a terminal according to an embodiment of the disclosure.

FIG. 14 is a flowchart illustrating a method performed by a terminal according to an embodiment of the disclosure.

Referring to FIG. 14, in operation 1401, the terminal may in case that a random access procedure for small data transmission (SDT) in a radio resource control (RRC) inactive state is initiated, transmit, to a base station, a RRC message including a parameter associated with a size of uplink data. In an embodiment, the RRC message may further include a parameter associated with a resume identity and a parameter associated with an authentication token. For example, the resume identity may indicate an identity of the terminal in the RRC inactive state. The parameter associated with the authentication token may include ResumeMAC-I, and the ResumeMAC-I is calculated by the terminal based on an integrity algorithm.

In an embodiment, the RRC message may further include a parameter associated with a resume cause indicating that a resume is for the SDT. In an embodiment, the terminal may transmit, to the base station, a random access preamble for the SDT. For example, the random access preamble may correspond to the size of the uplink data.

In operation 1403, the terminal may receive, from the base station, a response message including information associated with transmission resource for the uplink data. In an embodiment, the information associated with the transmission resource includes an uplink grant for the uplink data.

In an embodiment, the information associated with the transmission resource includes cell-radio network temporary identifier (C-RNTI) corresponding to a downlink control channel. For example, the terminal may monitor the downlink control channel based on the C-RNTI and receive, via the downlink control channel from the base station, information associated with an uplink grant for the uplink data.

In operation 1405, the terminal may transmit, to the base station, the uplink data based on the transmission resource. The terminal may receive, from the base station, a RRC release message for maintaining the terminal in the RRC inactive state.

Figure 15:
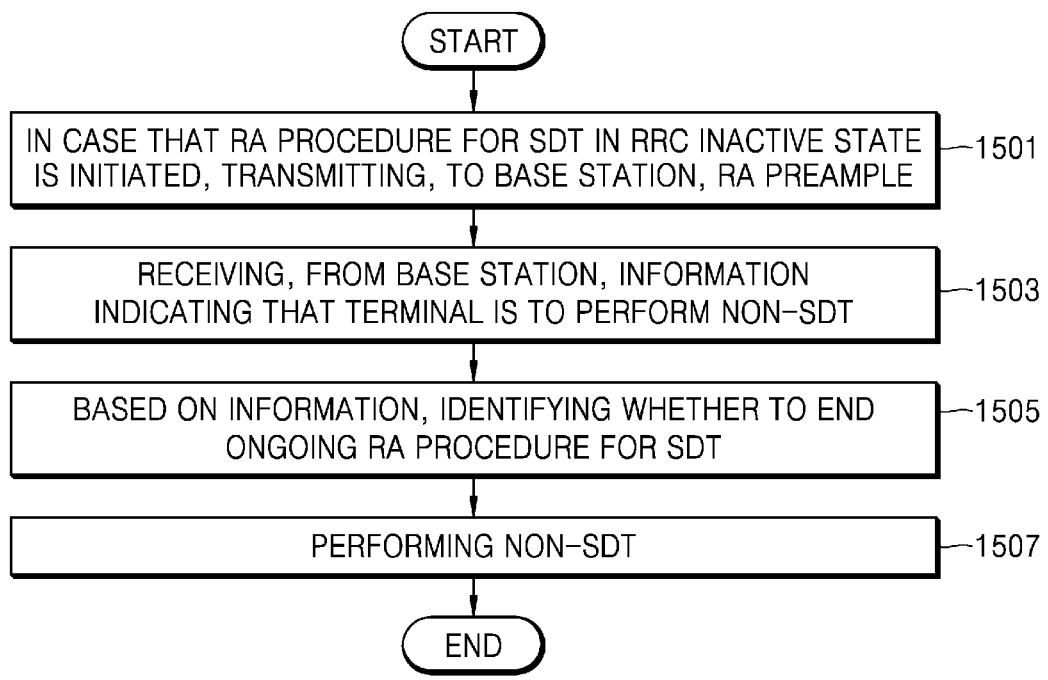
FIG. 15 is a flowchart illustrating a method performed by a terminal according to an embodiment of the disclosure.

FIG. 15 is a flowchart illustrating a method performed by a terminal according to an embodiment of the disclosure.

Referring to FIG. 15, in operation 1501, the terminal may in case that a random access procedure for small data transmission (SDT) in a radio resource control (RRC) inactive state is initiated, transmitting, to a base station, a random access preamble.

In operation 1503, the terminal may receive, from the base station, information indicating that the terminal is to perform non-SDT. For example, the information may be transmitted via downlink control information (DCI) or a message in response to the random access preamble. The message in response to the random access preamble may include a reserved backoff indicator (BI) value indicating that the terminal is to perform the non-SDT.

In operation 1505, the terminal may identify whether to end the ongoing random access procedure for the SDT. In an embodiment, the terminal may, based on the identification, maintain the ongoing random access procedure. In another embodiment, the terminal may, based on the identification, end the ongoing random access procedure.

In operation 1507, the terminal may perform the non-SDT based on the identification. For example, in case that the ongoing random access procedure is maintained, the terminal may identify a random access preamble for a subsequent random access procedure among random access preambles for the non-SDT. Furthermore, in case that the ongoing random access procedure is maintained, a parameter associated with a preamble transmission counter and a parameter associated with a preamble power ramping counter are not reset.

For example, in case that the ongoing random access procedure is ended, the terminal may initiate a random access procedure for the non-SDT. The terminal may identify a random access preamble among random access preambles for the non-SDT.

Methods according to the claims of the disclosure or the various embodiments of the disclosure described in the specification may be implemented in hardware, software, or a combination of hardware and software.

When implemented in software, a computer-readable storage medium storing one or more programs (software modules) may be provided. One or more programs stored in the computer-readable storage medium are configured for execution by one or more processors in an electronic device. The one or more programs may include instructions that cause the electronic device to perform the methods in accordance with the claims of the disclosure or the various embodiments of the disclosure described in the specification.

The programs (software modules, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or other types of optical storage device, and/or a magnetic cassette. Alternatively, the programs may be stored in a memory including a combination of some or all of them. There may be a plurality of memories.

The program may also be stored in an attachable storage device that may be accessed over a communication network including the Internet, an intranet, a Local Area Network (LAN), a wide area network (WAN), or a storage area network (SAN), or a combination thereof. The storage device may be connected to an apparatus performing the various embodiments of the disclosure through an external port. In addition, a separate storage device in the communication network may be connected to the apparatus performing the various embodiments of the disclosure.

In the various embodiments of the disclosure, a component is represented in a singular or plural form. It should be understood, however, that the singular or plural representations are selected appropriately according to the situations presented for convenience of explanation, and the disclosure is not limited to the singular or plural form of the component. Further, the component expressed in the plural form may also imply the singular form, and vice versa.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   transmitting, to a base station, a message A (MsgA) including a payload and a preamble, wherein the payload includes common control channel (CCCH) data and a medium access control (MAC) control element (CE) for a buffer status report (BSR), wherein the MAC CE for the BSR indicates a size of uplink (UL) data to be transmitted, and wherein the CCCH data includes an authentication token associated with a radio resource control (RRC) resume request, the authentication token being a resumeMAC-I;
   receiving, from the base station, a message B (MsgB) including a cell-radio network temporary identifier (C-RNTI);
   identifying that a random access procedure is completed, in case that a contention resolution identity included in the MsgB with a success random access response (RAR) matches the CCCH data included in the MsgA;
   monitoring a physical downlink control channel (PDCCH) addressed to the C-RNTI for a UL grant, after a completion of the random access procedure; and
   transmitting, to the base station, the UL data, based on the UL grant, in a radio resource control (RRC) inactive state, wherein the UL data is ciphered and integrity protected, based on at least one security key, and wherein the at least one security key is derived using a next hop chaining count value.

2. The method of claim 1, wherein the CCCH data further includes a parameter indicating an identity of the terminal.

3. The method of claim 1, wherein the transmission of the UL data is associated with a small data transmission (SDT) procedure.

4. The method of claim 3, wherein the SDT procedure is initiated based on a 2-step random access procedure.

5. A method performed by a base station in a wireless communication system, the method comprising:

receiving, from a terminal, a message A (MsgA) including a payload and a preamble, wherein the payload includes common control channel (CCCH) data and a medium access control (MAC) control element (CE) for a buffer status report (BSR), wherein the MAC CE for the BSR indicates a size of uplink (UL) data to be received, and wherein the CCCH data includes an authentication token associated with a radio resource control (RRC) resume request, the authentication token being a resumeMAC-I;

transmitting, to the terminal, a message B (MsgB) including a cell-radio network temporary identifier (C-RNTI), wherein the MsgB with a success random access response (RAR) including a contention resolution identity and the CCCH data included in the MsgA are associated with a completion of a random access procedure;

transmitting, to the terminal via a physical downlink control channel (PDCCH) addressed to the C-RNTI, a UL grant, after the completion of the random access procedure; and receiving, from the terminal, the UL data, based on the UL grant, in a radio resource control (RRC) inactive state, wherein the UL data is ciphered and integrity protected, based on at least one security key, and wherein the at least one security key is derived using a next hop chaining count value.

6. The method of claim 5, wherein the CCCH data further includes a parameter indicating an identity of the terminal.

7. The method of claim 5, wherein the reception of the UL data is associated with a small data transmission (SDT) procedure, and wherein the SDT procedure is initiated based on a 2-step random access procedure.

8. A terminal in a wireless communication system, the terminal comprising:

a transceiver; and at least one processor coupled with the transceiver and configured to:

transmit, to a base station via the transceiver, a message A (MsgA) including a payload and a preamble, wherein the payload includes common control channel (CCCH) data and a medium access control (MAC) control element (CE) for a buffer status report (BSR), wherein the MAC CE for the BSR indicates a size of uplink (UL) data to be transmitted, and wherein the CCCH data includes an authentication token associated with a radio resource control (RRC) resume request, the authentication token being a resumeMAC-I, receive, from the base station via the transceiver, a message B (MsgB) including a cell-radio network temporary identifier (C-RNTI), identify that a random access procedure is completed, in case that a contention resolution identity included in the MsgB with a success random access response (RAR) matches the CCCH data included in the MsgA, monitor, via the transceiver, a physical downlink control channel (PDCCH) addressed to the C-RNTI for a UL grant, after a completion of the random access procedure, and transmit, to the base station via the transceiver, the UL data, based on the UL grant, in a radio resource control (RRC) inactive state, wherein the UL data is ciphered and integrity protected, based on at least one security key, and wherein the at least one security key is derived using a next hop chaining count value.

9. A base station in a wireless communication system, the base station comprising:

a transceiver; and at least one processor coupled with the transceiver and configured to:

receive, from a terminal via the transceiver, a message A (MsgA) including a payload and a preamble, wherein the payload includes common control channel (CCCH) data and a medium access control (MAC) control element (CE) for a buffer status report (BSR), wherein the MAC CE for the BSR indicates a size of uplink (UL) data to be received, and wherein the CCCH data includes an authentication token associated with a radio resource control (RRC) resume request, the authentication token being a resumeMAC-I, transmit, to the terminal via the transceiver, a message B (MsgB) including a cell-radio network temporary identifier (C-RNTI), wherein the MsgB with a success random access response (RAR) including a contention resolution identity and the CCCH data included in the MsgA is-are associated with a completion of a random access procedure, transmit, to the terminal via a physical downlink control channel (PDCCH) addressed to the C-RNTI, a UL grant, via the transceiver, after the completion of the random access procedure, and receive, from the terminal via the transceiver, the UL data, based on the UL grant, in a radio resource control (RRC) inactive state, wherein the UL data is ciphered and integrity protected, based on at least one security key, and wherein the at least one security key is derived using a next hop chaining count value.

* * * * *